(12) United States Patent
Kupka

(10) Patent No.: US 7,164,410 B2
(45) Date of Patent: Jan. 16, 2007

(54) MANIPULATING AN ON-SCREEN OBJECT USING ZONES SURROUNDING THE OBJECT

(75) Inventor: Sig G. Kupka, 27319 Julietta La., Los Altos Hills, CA (US) 94022

(73) Assignee: Sig G. Kupka, Los Altos Hills, CA (US)

( * ) Notice: Subject to any disclaimer, the term of this patent is extended or adjusted under 35 U.S.C. 154(b) by 442 days.

(21) Appl. No.: 10/629,129

(22) Filed: Jul. 28, 2003

(65) Prior Publication Data

US 2005/0024322 A1 Feb. 3, 2005

(51) Int. Cl.
*G09G 5/00* (2006.01)
*G06F 3/00* (2006.01)

(52) U.S. Cl. .................. 345/156; 345/172; 345/173; 715/810

(58) Field of Classification Search ............ 345/156, 345/157, 163, 168, 173, 179, 172; 715/810, 715/834, 835, 840
See application file for complete search history.

(56) References Cited

U.S. PATENT DOCUMENTS

| | | | | |
|---|---|---|---|---|
| 4,202,037 A * | 5/1980 | Glaser et al. | ............... | 345/632 |
| 5,500,935 A | 3/1996 | Moran et al. | | |
| 5,543,818 A * | 8/1996 | Scott | ............... | 345/168 |
| 5,689,667 A * | 11/1997 | Kurtenbach | ............... | 715/810 |
| 5,754,176 A | 5/1998 | Crawford | | |
| 5,778,404 A | 7/1998 | Capps et al. | | |
| 5,805,167 A | 9/1998 | van Cruyningen | | |
| 6,094,197 A | 7/2000 | Buxton et al. | | |
| 6,177,941 B1 * | 1/2001 | Haynes et al. | ............... | 715/810 |
| 6,424,335 B1 * | 7/2002 | Kim et al. | ............... | 345/158 |
| 6,664,991 B1 | 12/2003 | Chew et al. | | |
| 6,727,830 B1 | 4/2004 | Lui et al. | | |
| 6,822,664 B1 | 11/2004 | Vale | | |
| 6,904,570 B1 | 6/2005 | Foote et al. | | |

OTHER PUBLICATIONS

Todd Hodes And Randy Katz, "Enabling "Smart Spaces:" Entity Description and User Interface Generation for a Heterogeneous Component-Based Distributed System," University of California, Berkeley, Computer Science Division, pp. 1-8, Jul. 17, 1998.
Ben Shneiderman, "Direct Manipulation for Comprehensible, Predictable and Controllable User Interfaces," Institute for Systems Research, Human Computer Interaction Laboratory, Department of Computer Science, 10 pages.
Richard E. Sweet, "The Mesa Programming Environment," Xerox Palo Alto Research Center, ACM 0-89791-165-2/85/006/0216, pp. 216-229, 1985.

* cited by examiner

*Primary Examiner*—Dennis-Doon Chow
(74) *Attorney, Agent, or Firm*—Fenwick & West LLP

(57) ABSTRACT

A user interface for manipulating objects of various types in a consistent manner. Each on-screen object is surrounded by a control region including a number of zones for performing various control operations on the object. Multiple input modes are available for interacting with the zones, allowing object manipulation commands to be initiated in several different ways, such as via stroke input, pressing a mouse button, double-clicking, menu selection, voice input, and the like. The user interface is operable using any of several different types of input devices.

51 Claims, 13 Drawing Sheets

| Delete 103C | Create 103E | End 103H | |
|---|---|---|---|
| Insert 103B | Drag 103J | Shift 103G | Go To 103K |
| Start 103A | Format 103D | Change To 103F | |

*FIG. 3A*

| Fill color 103A | Zoom 103B | Undo 103C | |
|---|---|---|---|
| Text color 103D | Copy 103J | Transform To 103E | Scroll 103K |
| Border color 103F | Align 103G | Border 103H | |

*FIG. 3B*

MANIPULATING AN ON-SCREEN OBJECT USING ZONES SURROUNDING THE OBJECT

CROSS-REFERENCE TO RELATED APPLICATION

The present application is related to U.S. Utility patent application Ser. No. 10/629,052 for "Common On-Screen Zone For Menu Activation And Stroke Input," filed on the same date as the present application. The disclosure of the related application is incorporated herein by reference.

BACKGROUND OF THE INVENTION

1. Field of the Invention

The present invention relates generally to user interfaces for managing on-screen objects, and more particularly to a user interface that provides a consistent set of object management zones surrounding an on-screen object.

2. Description of the Background Art

Existing user interfaces provide many different techniques for moving, altering, controlling, and otherwise manipulating on-screen objects such as windows, images, text blocks, video, and the like. For example, the Windows XP operating system, available from Microsoft Corporation of Redmond, Wash., provides user interface mechanisms for manipulating various types of on-screen objects. Examples of such user interface mechanisms include:

- application menus (e.g., click on an object to select it, and select an operation from an application menu);
- on-screen buttons (e.g., click on an object to select it, and click a button to perform an operation on the object);
- context-sensitive menus (e.g., right-click on an object and select an operation from a pop-up menu);
- resize borders or handles (e.g., click-drag a window edge or object handle to resize the window or object); and
- keyboard commands (e.g., click on an object to select it (or use a keyboard to navigate to an on-screen object), and hit a keystroke to perform an operation on the object).

One problem with most existing techniques is that there is no consistent user interface paradigm for manipulating objects of different types. For example, the user interface for controlling text objects is significantly different from the user interface for controlling graphic objects. If a user wishes to resize a text object by increasing the text font, he or she performs an entirely different action than he or she would perform for resizing a graphic object. Accordingly, users must learn a variety of different manipulation methods, and know when to apply which method to which type of object. Often users become disoriented and confused when attempting to control certain types of objects, particularly when the user interface elements for the object being controlled differ from those to which the user has become accustomed.

Furthermore, existing techniques for activating certain object manipulation operations can be cumbersome, difficult to learn, or counterintuitive. For example, specialized on-screen objects, such as objects for representing time periods, often employ different user interface paradigms that may be unfamiliar to users.

In addition, many such techniques do not translate well from one input mechanism to another (such as pen-based, mouse, voice, and keyboard input mechanisms). Users switching from one input mechanism to another must often learn a new object control paradigm in order to use the software effectively.

What is needed, therefore, is a consistent, unified user interface paradigm for providing controls for manipulating on-screen objects, which addresses the limitations of conventional schemes. What is further needed is a user interface paradigm that is extensible and that facilitates ease of use and ease of learning, even when the user is attempting to manipulate different types of objects. What is further needed is a user interface paradigm that is usable with different types of input mechanisms, and that facilitates transitions from one input mechanism to another with minimal disruption, confusion, and re-learning.

SUMMARY OF THE INVENTION

In one aspect of the present invention, each object is surrounded by a number of zones for performing various control operations on the object. The appearance of the zones can vary from one embodiment to another, but in general is kept consistent among various object types within a particular user interface. The zones surrounding an object are referred to collectively as a control region. Each zone of the control region is associated with a series of commands related to a particular type of editing or manipulation function. Displaying the control region around the object enables the user to immediately focus on and identify editing functions that can be performed on the object. Further, because of the proximity of the control region about the object, the user does not need to move the cursor to a distinct menu, tool palette, or other user interface element, and as such, the user can select and execute the desired command more quickly and efficiently.

In one embodiment, one control region is visible at a time, corresponding to the object that is currently active (that is, the object that currently has focus); in another embodiment, control regions for some or all on-screen objects are visible at the same time.

In one embodiment, the control region for an object includes at least nine zones that surround the object itself. The nine zones, including one overlaying the object representation itself, form a three-by-three matrix. In one embodiment the object representation is located in the same area as the center zone. Thus, eight zones surround the object, forming four corners and four sides, and one zone overlays the object. These zones provide additional control functionality for manipulating the object. In one embodiment, additional zones are provided, including any or all of: a rectangular band-shaped zone located at the outside edge of the center zone, another rectangular band-shaped zone located at the outside edge of the control region, and a rectangular zone located along an edge of the control region. One skilled in the art will recognize that any number of zones may be provided, in any arrangement or layout, without departing from the essential characteristics of the present invention.

The user specifies commands for manipulating the on-screen object by interacting with the zones within the object's control region. Interaction modes include, for example: pen (touch, press, stroke, or the like); mouse; keyboard; voice; remote controller; and the like. In one embodiment, the user interface of the present invention is capable of receiving user commands in at least two of the above modes, thus allowing a user to interact with the system in a consistent manner using two or more input devices. Commands can be activated in different ways, including menu selection, strokes, clicks, button presses, and the like, performed in the area defined by the corresponding zone. In one embodiment, available commands for interacting with an object including both geometric editing operations (i.e., those that involve moving, resizing, distorting, and/or rotating), and non-geometric editing operations.

The invention thus provides an easy-to-use, understandable user interface paradigm wherein the control region for each object surrounds the object itself, provides access to all relevant editing operations with respect to the object, and provides multiple input modes that operate consistently, and wherein interactions with zones are consistent from one object type to another.

BRIEF DESCRIPTION OF THE DRAWINGS

FIGS. 3A and 3B depict examples of command structures for the zones of an object, according to one embodiment.

DETAILED DESCRIPTION OF A PREFERRED EMBODIMENT

The following description of system components and operation is merely exemplary of embodiments of the present invention. One skilled in the art will recognize that the various designs, implementations, and techniques described herein may be used alone or in any combination, and that many modifications and equivalent arrangements can be used. Accordingly, the following description is presented for purposes of illustration, and is not intended to limit the invention to the precise forms disclosed.

The invention may be implemented, for example, on a conventional personal computer running any known operating system, such as Microsoft Windows XP available from Microsoft Corporation of Redmond, Wash. As described below, input to the system of the invention can be provided by any of a number of types of devices, including for example: keyboard, mouse, touchscreen, touchpad, trackball, tablet, microphone, remote control device, and/or the like. As will be seen from the following description, the present invention provides techniques for accepting user inputs from various types of input devices and according to various modes in a consistent and intuitive manner.

One skilled in the art will recognize that the user interface techniques of the present invention may be implemented on devices other than personal computers in which a display is provided to the user. For example, such techniques may be implemented on cell phones, consumer electronic devices, personal digital assistants, office appliances, wall-mounted controllers, automotive control systems, and the like. The description of the invention herein as it might be implemented on a personal computer is not intended to restrict the scope of the present invention or the range of devices on which it can operate.

User Interface Layout

Figure 1:
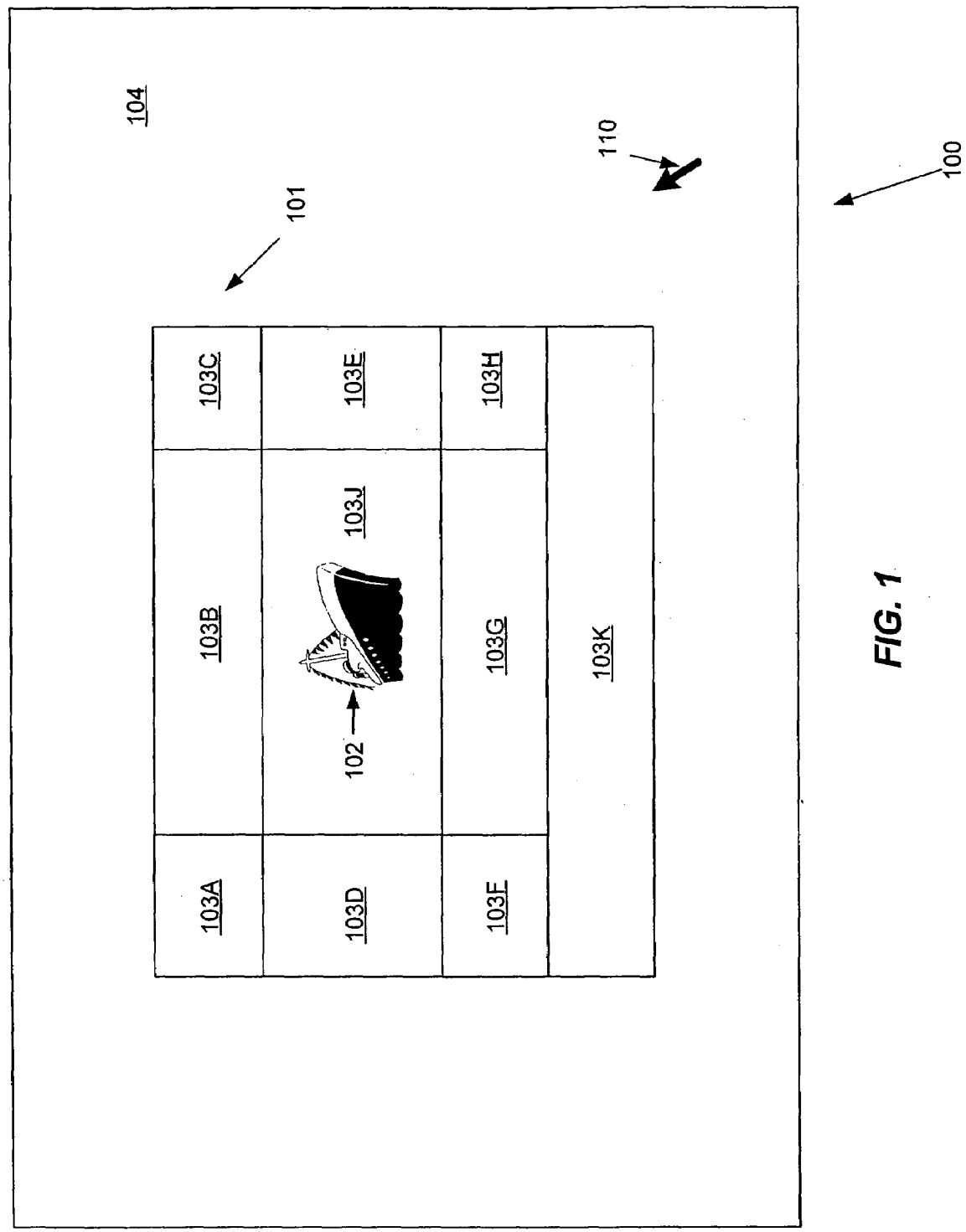
FIG. 1 depicts an example of a control region for an on-screen object, according to one embodiment.

Referring now to FIG. 1, there is shown an example of a user interface 100 according to an embodiment of the present invention. User interface 100 may be displayed, for example, on a display screen of a conventional personal computer. Object 102 is an example of an on-screen object displayed within user interface 100. In the example of FIG. 1, object 102 is a graphic object. However, one skilled in the art will recognize that object 102 can be a text object, or a representation of a video or audio object, or any other type of object that can be displayed or represented within the context of user interface 100.

As shown in FIG. 1, according to one embodiment object 102 is surrounded by various zones 103(A–K), referred to collectively as a control region. Each zone 103 provides a designated type of functionality for controlling one or more aspects of object 102, or otherwise manipulating object 102. Object 102, together with the surrounding control region including zones 103, form a window within user interface 100.

The area of user interface 100 surrounding the window is referred to as a "panel" 104. Any number of windows can be presented within panel 104 simultaneously, and these windows can overlap one another, or they can be tiled, minimized, or otherwise manipulated according to known user interface techniques as modified and enhanced by the improvements of the present invention. In one embodiment, only one window is active at any given time, and this is the window for the object that has the focus or that is currently active. The user can cause a window (and its object 102) to be active according to well-known techniques such as: moving a cursor to a window and clicking a button; or using a series of keystrokes or voice commands to select and activate a particular window. In one embodiment, zones 103 are displayed only for the currently active window, and are omitted for all other windows. In another embodiment, zones 103 are displayed for all on-screen windows. In addition, in one embodiment panel 104 itself is treated like any other window, so that it can be activated and zones 103 relevant to the control and manipulation of panel 104 can be displayed. Also shown is cursor 110, which is controlled by the user via a mouse or other pointing device, and can be used to select and activate commands and menus as described below.

Figure 1A:
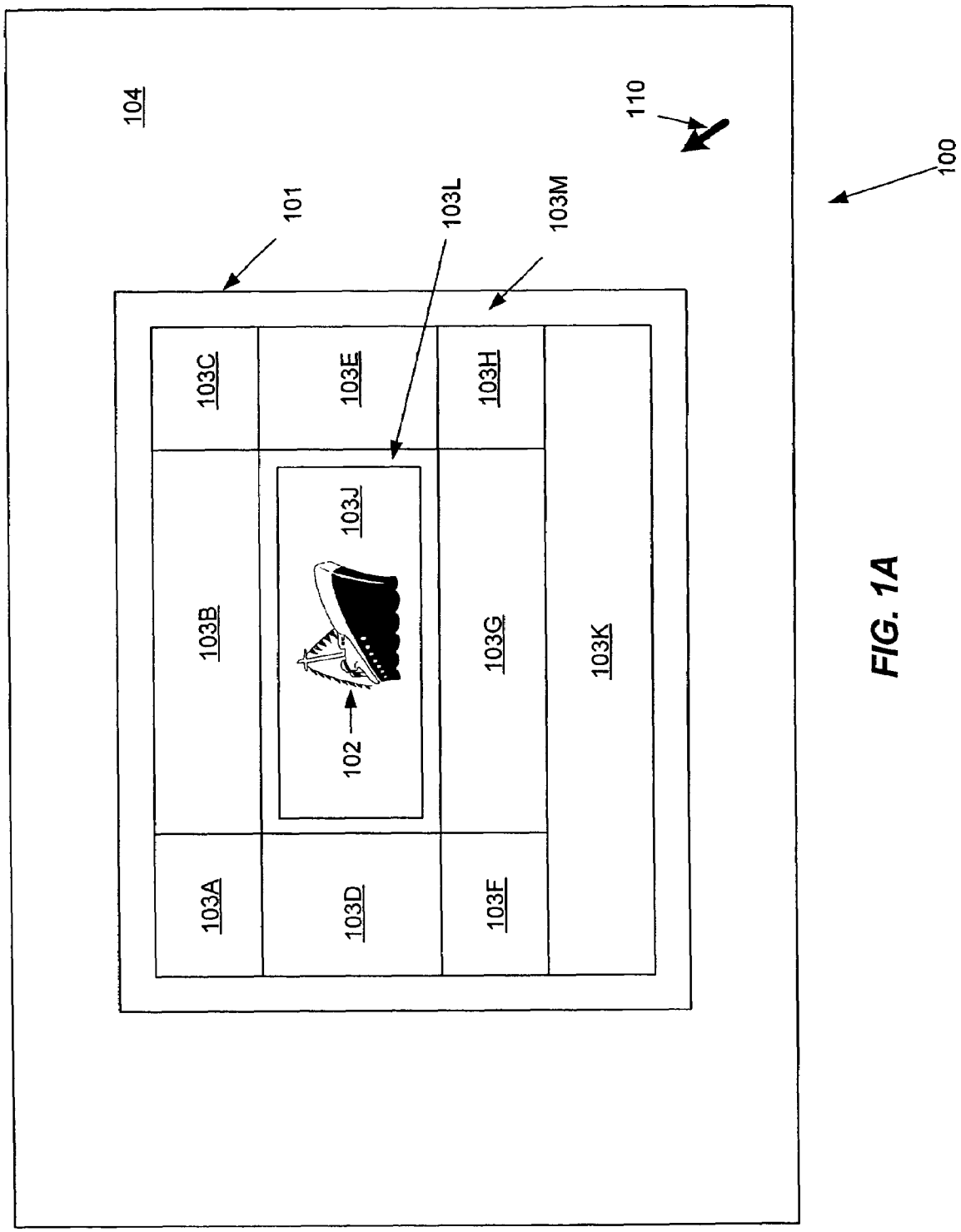
FIG. 1A depicts an example of a control region for an on-screen object including additional rectangular band-shaped regions.

In the example of FIG. 1, ten zones 103A through 103K are shown, including zone 103J that overlays object 102, and zone 103K that is located outside control region 101. Zone 103K is depicted in the drawings as extending along the bottom of region 101, but in one embodiment includes all areas not within region 101. One skilled in the art will recognize that any number of zones could be included, and that the particular arrangement of zones 103 shown in FIG. 1 is merely exemplary. For example, as shown in FIG. 1A, additional rectangular band-shaped regions 103L, 103M could be located at the outer edge of zone 103J and at the outer edge of control region 101.

Input Mechanisms

In operation, the device on which the user interface 100 operates detects user commands with respect to the various zones 103 of an onscreen object 102. For example, a user may use a mouse or other input device to move an onscreen cursor 110 to a zone 103. The user may then perform an action, such as clicking a button on a mouse, to activate a command or operation associated with the zone 103. As will be described in more detail below, some zones 103 may have different commands or operations associated with different user actions; for example, a user may click a left button to activate a first command, or a right button to activate a second command. Other possible actions associated with different types of commands include: "stroking" within a zone 103 by holding down a button and moving the cursor 110 a short distance in a particular direction; "shift-clicking" within a zone 103 by holding down a shift key (or other modifier key) while clicking within the zone 103; or double- or triple-clicking within a zone 103.

Any of the above-described input devices can be used for interacting with zones 103. Examples of user action and input mechanisms for interacting with zones 103 include:

Pen input: Suitable for handwriting input, stroking, gestures, symbols, and abbreviations;

Mouse or other pointing device: Suitable for clicking, dragging, stroking, and the like;

Keyboard: Suitable for text entry, navigation among on-screen elements, or single-key activation of commands;

Voice input: Suitable for activating commands and for inputting text. The user speaks the name of a zone (e.g., "copy") to display a menu for that zone, and then speaks a command from the displayed menu to activate that command.

Remote control (e.g., RF or IR transmitter) input: Suitable for navigation, data entry, command activation, and possibly cursive writing and stroking.

In one embodiment, the user interface of the present invention is capable of receiving user commands in a consistent manner in two or more of the above modes.

User Actions

Figure 2:
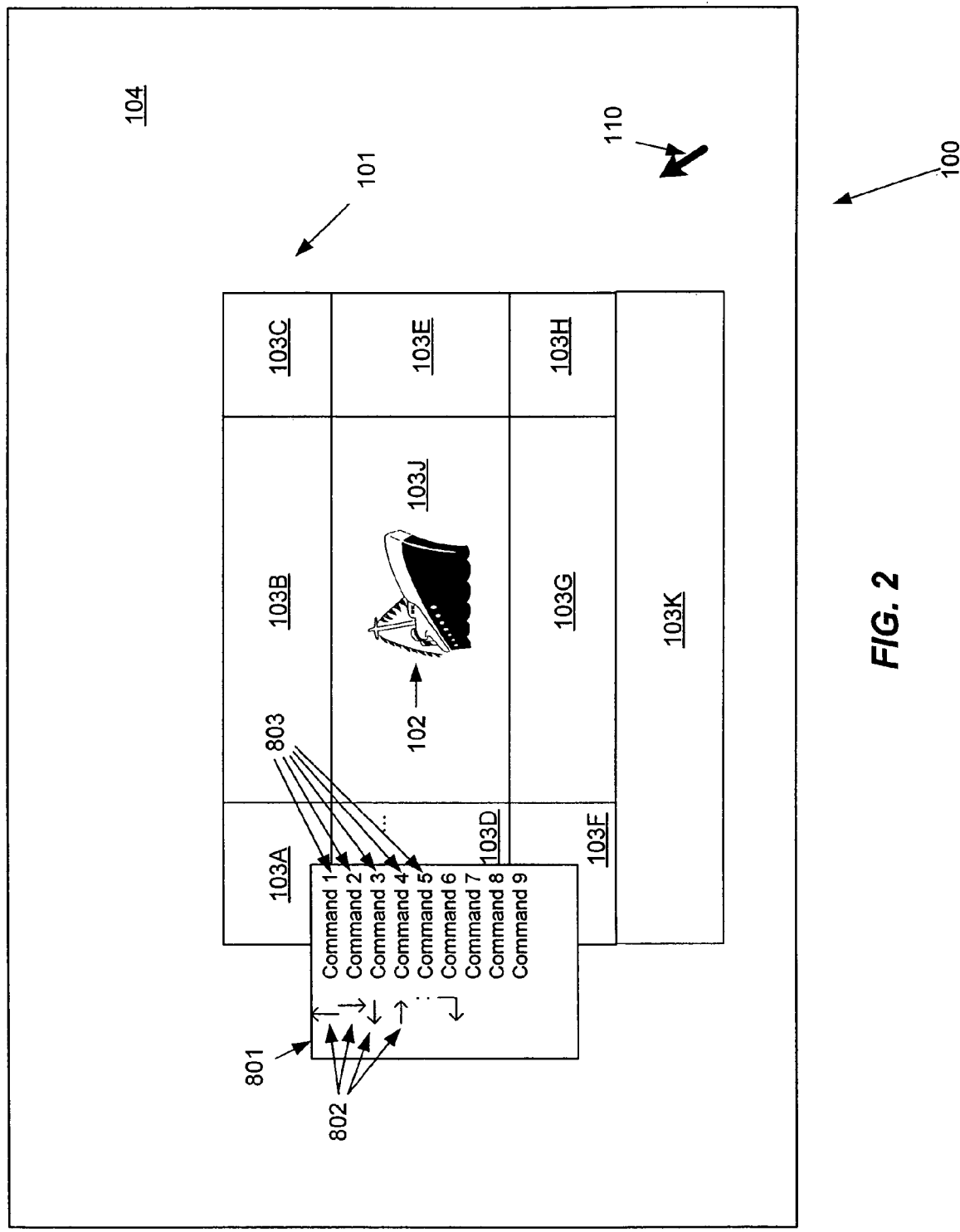
FIG. 2 depicts an example of a menu associated with a zone, according to one embodiment of the invention.

Many different command sets are possible. In one embodiment, the user can perform the following user input actions to activate commands:

Click standard button (e.g. left-click) while cursor 110 is in zone 103 (or, for pen input, touch zone 103 without pressing pen button): activates a pop-up menu, which may be also called a primary menu, containing commands for zone 103. The displayed pop-up menu shows the relevant commands for the zone 103, and allows the user to navigate and select one of the displayed commands using known menu navigation techniques. In one embodiment, each pop-up menu for each zone 103 is associated with a particular theme or general type of action, or group of associated actions. For example, a zone 103 may have a variety of commands or actions related to font characteristics; another zone 103 may have a variety of commands related to paragraph characteristics, and so forth. In one embodiment, included in the pop-up menu are commands that can be invoked by movement of the input device by a stroke in a predetermined direction (e.g., up, down, left, or right). FIG. 2 illustrates a pop-up menu showing four stroke icons 802, each stroke direction corresponding to a particular command. Also included is a command that corresponds to a double-click for zone 103. One skilled in the art will recognize that the menu can include commands for any other type of action or gesture that can be performed within zone 103, and may also include commands that cannot be activated directly using an action or a gesture. Referring now to FIG. 2, there is shown an example of such a menu 801, including commands 803 and icons 802 indicating corresponding stroke directions, and commands 803 having icons 802 indicating other actions such as a double-click and an Enter key.

Click alternate button (e.g. right-click), or modified button (e.g. shift-click), or click and hold button while cursor 110 is in zone 103 (or, for pen input, either touch zone 103 with pen button pressed, or touch and hold the pen in zone 103): activates an alternate pop-up menu, which may also be called a secondary menu. The alternate pop-up menu operates in a similar manner as the first pop-up menu 801, and also includes icons or indicators showing direct actions that correspond to stroke directions, double-click, and the like, where applicable. In one embodiment, the on-screen cursor 110 changes to indicate that the button has been held long enough to activate the alternate menu.

Stroke (i.e., hold down button and move cursor 110 a short distance in a particular direction) starting in zone 103 (or, for pen input, stroke without pressing pen button): performs an action associated with the particular stroke direction. Strokes can be of any type, including straight lines, curves, or more complex shapes or gestures. In one embodiment, as described herein, strokes are associated with particular directions (up, down, left, or right), although one skilled in the art will recognize that other types of strokes may also be used. As described above, in one embodiment, the pop-up menu 801 for a zone 103 includes each of the stroke directions and indicates what command is associated with each stroke direction. Thus, the user can activate any of these actions by performing the stroke input or by clicking and then selecting the desired item from the pop-up menu 801. Longer strokes can be associated with a click-and-drag action.

Double-click (or other action) in zone 103: performs an associated command. As described above, in one embodiment, the pop-up menu 801 for a zone 103 indicates what command is associated with double-clicking (or other actions). Thus, the user can activate the command by double-clicking or by clicking and then selecting the desired item from the pop-up menu 801.

Alternate stroke (i.e., hold down alternate button (right button), or modified button (shift-stroke), and move cursor 110 a short distance in a particular direction) starting in zone 103 (or, for pen input, stroke while pressing pen button, or hold pen in place for a moment and then stroke): performs an alternate command associated with the particular stroke direction (up, down, left, or right). As described above, in one embodiment, the alternate pop-up menu for a zone 103 includes each of the stroke directions and indicates what alternate action is associated with each stroke direction. In one embodiment, the on-screen cursor 110 changes when the modifier key is pressed, to remind the user that the alternate command will be performed.

Alternate double-click (i.e., hold down alternate button (right button), or modified button (shift-stroke), and double-click) in zone 103: performs an associated command. As described above, in one embodiment, the pop-up menu 801 for a zone 103 indicates what command is associated with alternate double-clicking (or other actions). Thus, the user can activate the command by alternate double-clicking or by clicking and then selecting the desired item from the pop-up menu 801.

Alternate menus, stroke commands, double-clicks, and the like can be activated in a number of different ways, depending on the input device. For two-button devices, the alternate button can be used to activate the alternate commands. For one-button devices, the alternate menus and strokes can be activated by pressing and holding the button down for a moment without movement. In one embodiment, the on-screen cursor 110 changes to indicate when the alternate action will be performed. A mechanism for keyboard activation of commands is described in more detail below.

EXAMPLES OF COMMAND STRUCTURES

Referring now to FIGS. 3A and 3B, there are shown examples of command structures according to one embodiment, based on the zone layout shown in FIG. 1. FIG. 3A depicts command types corresponding to primary menus, and FIG. 3B depicts command types corresponding to secondary, or alternate, menus.

In general, each zone 103 is associated with a number of actions that are related to a particular function or type, as set forth below. Although these actions are in general consistent among object types, some actions may be object-specific and/or inapplicable to certain types of objects.

In addition to the most commonly used actions that are generally accessible via a primary menu 801, each zone 103 is also associated with an alternate action or set of actions. For example, an alternate menu may be accessed by right-clicking or option-clicking a mouse, or by pressing a shift key prior to pressing a zone 103 activation key. Alternate keystrokes can be accessed by stroking while holding down a right mouse button, or a modifier key such as shift or option. Other techniques may also be used for accessing alternate actions.

The following tables summarize primary command menus for the various zones 103 according to one embodiment. For each type of object listed, a number of available commands are shown; these commands may be available via a primary menu 801 and/or via stroke commands, double-clicks or other actions, as indicated on the table with symbols such as <<(left stroke), >> (right stroke), ˆ (up stroke), v (down stroke), and : (double-click).

| Upper Left Zone 103A: Start | |
|---|---|
| Object | Commands |
| Document | Start (changes top-left corner of document): |
| | << Left (unit panel) |
| | >> Right (unit panel) |
| | /\ Up (unit panel) |
| | \/ Down (unit panel) |
| | : Reset |

| Upper Left Zone 103A: Start -continued | |
|---|---|
| Object | Commands |
| While browsing or entering characters: | Start (changes first character): |
| Text | << Remove (leading character) |
| File | >> Add (leading blank) |
| Date | /\ Single quote |
| Image (entering characters only) | \/ Cedilla ( , ) |
| Music | : Reset (remove special |
| Video | characters) |
| Message | Parenthesis |
| | Bracket |
| | Curly bracket |
| While playing: | Start (changes playing position): |
| Music | << Left (second) |
| Video | >> Right (second) |
| Message | /\ Up (frame 1/30 s) |
| | \/ Down (frame 1/30 s) |
| | : Reset (start to 0:00:00) |
| Image | Start (changes top-left corner cropping): |
| | << Left (pixel) |
| | >> Right (pixel) |
| | /\ Up (pixel) |
| | \/ Down (pixel) |
| | : Reset |
| Shape | Start (changes top-left extent of Shape): |
| | << Left (pixel) |
| | >> Right (pixel) |
| | /\ Up (pixel) |
| | \/ Down (pixel) |
| | : Reset (align to grid) |
| Overlay objects (excludes: Document, Column, Row, Cell) | Start (changes top-left extent of Object): |
| | << Left (pixel) |
| | >> Right (pixel) |
| | /\ Up (pixel) |
| | \/ Down (pixel) |
| | : Reset (align to grid) |
| Paragraph | Start (changes top-left margin): |
| List | << Left (character) |
| Item in List | >> Right (character) |
| Table | /\ Up (0.2 line) |
| | \/ Down (0.2 line) |
| | : Reset |
| Date | Start (Date object): |
| | << Left (back 1 month) |
| | >> Right (forward 1 month) |
| | /\ Up (forward 1 day) |
| | \/ Down (back 1 day) |
| | : Today |
| | Yesterday |
| | Tomorrow |
| Number | Start (numeric value): |
| | << Left (much smaller) |
| | >> Right (much larger) |
| | /\ Up (larger) |
| | \/ Down (smaller) |
| | : Round (zero last non-zero digit) |
| Time | Start (start time): |
| | << Left (qtr. hour) |
| | >> Right (qtr. hour)) |
| | /\ Up (minute) |
| | \/ Down (minute) |
| Column | Not Available |
| Row | |
| Cell | |

-continued

| Upper Middle Zone 103B: Insert | |
|---|---|
| Object | Commands |
| While browsing: | Insert: |
| Document | << Insert contents of clipboard before current object |
| Text | |
| File | >> Insert contents of clipboard after current object |
| Date | |
| Image | \/ Add current object to clipboard |
| Music | /\ Replace clipboard with copy of current object |
| Video | |
| Message | : Save (link names for later insert) |
| Shape | Link name 1 |
| Number | Link name 2 |
| Time | ... |
| Paragraph | Link name n |
| List | |
| Item in List | |
| Table | |
| Row | |
| Column | |
| Cell | |
| While entering characters: | Insert: |
| Text | << Insert contents of clipboard before cursor position |
| File | |
| Image | >> Insert contents of clipboard after cursor position |
| Music | |
| Video | /\ Replace clipboard with text of current object |
| Message | \/ Add text of current object to clipboard |
| | Insert (Clipboard with 1 objects): |
| | << Insert contents of clipboard before current selection |
| | >> Insert contents of clipboard after current selection |
| | /\ Replace clipboard with current selection |
| | \/ Add current selection to clipboard |

| Upper Right Zone 103C: Delete | |
|---|---|
| Object | Commands |
| Document: | Delete (entire document): |
| | /\ Replace (Clipboard with document) |
| | \/ Add (to Clipboard) |
| | : This |
| While browsing: | Delete (objects): |
| Text | << Before (this object) |
| File | >> After (this object) |
| Date | /\ Replace (Clipboard with this object) |
| Image | \/ Add (this object to Clipboard) |
| Music | : This (object) |
| Video | |
| Message | |
| Shape | |
| Number | |
| Time | |
| While entering characters: | Delete (characters): |
| Text | << Before (cursor) |
| File | >> After (cursor) |
| Image | /\ Replace (Clipboard with text of object) |
| Music | \/ Add (text of object to Clipboard) |
| Video | : This (adjacent word) |
| Message | Delete (characters): |
| | << Before (selection) |
| | >> After (selection) |
| | /\ Replace (Clipboard with selection) |
| | \/ Add (selection to Clipboard) |
| | : This (selection) |
| Paragraph: | Delete (objects): |
| List | << Before (this object) |
| Item in List | >> After (this object) |
| Table | /\ Replace (Clipboard with this object) |

| Upper Right Zone 103C: Delete | |
|---|---|
| Object | Commands |
| Row | \/ Add (this object to Clipboard) |
| Column | : This (object) |
| Cell | Content (keep this object) |

| Middle Left Zone 103D: Format | |
|---|---|
| Object | Commands |
| Document: | Format: |
| Text | << Cross out (Strike-through) |
| File | >> Italic |
| Date | /\ Bold |
| Image | \/ Underline |
| Music | : Reset (normal) |
| Video | Save (format) |
| Message | Apply (saved format) |
| Number | Apply current format to preceding object |
| Time | Apply current format to successive object |
| Paragraph | |
| List | |
| Item in List | |
| Table | |
| Row | |
| Column | |
| Cell | |
| Shape: | Format: |
| Line | << Starting arrow |
| Arc | >> Ending arrow |
| Scribble | Save (format) |
| | Apply (saved format) |
| | Apply current format to preceding object |
| | Apply current format to successive object |
| Shape: | Not available |
| Rectangle | |
| Oval | |
| Point | |

| Middle Right Zone 103E: Create | |
|---|---|
| Object | Commands |
| While browsing: | Create (new object): |
| Document | << Before (same) |
| Text | >> After (same) |
| File | /\ Parent (same as parent) |
| Date | \/ Child (same as last child) |
| Image | : Text |
| Music | Time |
| Video | Number |
| Message | Scribble (Shape) |
| Shape | Line (Shape) |
| Number | Rectangle (Shape) |
| Time | Arc (Shape) |
| Paragraph | Oval (Shape) |
| List | Point (Shape) |
| Item in List | Paragraph |
| Table | Group |
| Row | List |
| Column | Table |
| Cell | Date |
| | File |
| | Image |
| | Message |
| | Music |
| | Video |

Middle Right Zone 103E: Create

| Object | Commands |
|---|---|
| While entering characters:<br>Text<br>File<br>Image<br>Music<br>Video<br>Message | Create (abbreviation):<br><< Collapsed (long -> short)<br>>> Expanded (short -> long)<br>/\ Deletion (from abbreviation list)<br>\/ Addition (short \| long)<br>: All (expand all abbreviations)<br>Long 1 (short 1)<br>Long 2 (short 2)<br>...<br>Long n (short n) |
| Overlay objects (excludes:<br>Document, Column, Row, Cell) | Create (new object):<br><< Left (same to left)<br>>> Right (same to right)<br>/\ Up (same above)<br>\/ Down (same below)<br>: Text<br>Time<br>Number<br>Scribble (Shape)<br>Line (Shape)<br>Rectangle (Shape)<br>Arc (Shape)<br>Oval (Shape)<br>Point (Shape)<br>Paragraph<br>Group<br>List<br>Table<br>Date<br>File<br>Image<br>Message<br>Music<br>Video |

Lower Left Zone 103F: Change To

| Object | Commands |
|---|---|
| Document | Change (Bookmark) to:<br><< Remove<br>>> Add<br>/\ Previous (first)<br>\/ Next (last)<br>: Reset (load Resource file)<br>Bookmark 1<br>Bookmark 2<br>...<br>Bookmark n |
| While browsing or entering characters:<br>Text<br>File<br>Image (entering characters only)<br>Music<br>Video<br>Message | Change (characters) to:<br><< First letter CAP<br>>> Title case<br>/\ Uppercase<br>\/ Lowercase<br>: Reset (automatic CAPS) |
| While playing:<br>Music<br>Video<br>Message | Change (playing position) to:<br><< Fast reverse (15 seconds)<br>>> Fast forward (15 second)<br>/\ Previous (clip)<br>\/ Next (clip)<br>: Reset (to start of clip)<br>Random (order of play)<br>Sequential (order of play) |
| Date | Change (Date) to:<br><< Lower (year)<br>>> Higher (year)<br>/\ Previous (type)<br>\/ Next (type)<br>: Reset (Aug 10, 2003) |

Lower Left Zone 103F: Change To

| Object | Commands |
|---|---|
| | Month day (August 10)<br>Long (Aug. 10, 2003)<br>Day of week<br>(Sunday Aug. 10, 2003)<br>Concise (Aug. 10, 2003)<br>Minimum (8/10) |
| Paragraph<br>List<br>Item in List<br>Table | Change (Paragraph) to:<br><< Left (objects flow to right)<br>>> Right (objects flow to left)<br>: Reset (no flow)<br>Title case (override all)<br>Uppercase (override all)<br>Lowercase (override all)<br>None (remove CAPS override) |
| Row<br>Column<br>Cell | Change to:<br>Title case (override all)<br>Uppercase (override all)<br>Lowercase (override all)<br>None (remove CAPS override) |
| Number | Change (Number) to:<br><< Smaller (divide by 10)<br>>> Larger (multiply by 10)<br>/\ Previous (type)<br>\/ Next (type)<br>: Reset<br>Normal (Integer or decimal)<br>Scientific notation<br>Percent<br>Dollars |
| Time | Change (alarm start time) to:<br><< Left (qtr.hour)<br>>> Right (qtr.hour))<br>/\ Up (minute)<br>\/ Down (minute)<br>: Reset (remove alarm) |
| Shape<br>Image | Change (rotation) |

Lower Middle Zone 103G: Shift

| Object | Commands |
|---|---|
| While browsing:<br>Document<br>Paragraph<br>List<br>Item in List<br>Table<br>Column<br>Row<br>Cell | Shift:<br><< First (child object)<br>>> Last (child object)<br>/\ Parent<br>\/ Child<br>: Play mode |
| While entering characters:<br>Text<br>File<br>Image<br>Music<br>Video<br>Message | Shift:<br><< First (char. text entry)<br>>> Last (char. text entry)<br>/\ Parent<br>: Play mode |
| While playing:<br>Music<br>Video<br>Message | Shift (playing position):<br><< Left (second)<br>>> Right (second)<br>/\ Up (frame 1/30 s)<br>\/ Down (frame 1/30 s)<br>: Reset (to start of clip) |
| Shape | Shift (opacity = 36%):<br><< Less (opaque)<br>>> More (opaque)<br>/\ Transparent<br>\/ Opaque |
| Number<br>Time | Not Available |

Lower Right Zone 103H: End

| Object | Commands |
|---|---|
| Document | End (changes bottom-right corner of document):<br><< Left (unit panel)<br>>> Right (unit panel)<br>/\ Up (unit panel)<br>\/ Down (unit panel)<br>: Reset |
| While browsing or entering characters:<br>Text<br>File<br>Date<br>Image (entering text only)<br>Music<br>Video<br>Message | End (changes terminating character):<br><< Remove<br>>> Question mark<br>/\ Exclamation point<br>\/ Semicolon<br>: Period<br>Single quote (surrounding object)<br>Double quote (surrounding object)<br>Parenthesis (surrounding object)<br>Bracket (surrounding object)<br>Curly bracket (surrounding object)<br>Copyright ( © )<br>Registered (trademark ® ) |
| While playing:<br>Music<br>Video<br>Message | End (changes playing position):<br><< Left (second)<br>>> Right (second)<br>/\ Up (frame 1/30 s)<br>\/ Down (frame 1/30 s)<br>: Reset (to end of clip) |
| Image | End (changes bottom-right corner cropping):<br><< Left (pixel)<br>>> Right (pixel)<br>/\ Up (pixel)<br>\/ Down (pixel)<br>: Reset (remove cropping) |
| Shape | End (changes bottom-right extent of Shape):<br><< Left (pixel)<br>>> Right (pixel)<br>/\ Up (pixel)<br>\/ Down (pixel)<br>: Reset (align to grid) |
| Overlay objects (excludes: Document, Column, Row, Cell) | End (changes bottom-right extent of Object):<br><< Left (pixel)<br>>> Right (pixel)<br>/\ Up (pixel)<br>\/ Down (pixel)<br>: Reset (align to grid) |
| Paragraph<br>List<br>Item in List<br>Table | End (changes bottom-right margins):<br><< Left (character)<br>>> Right (character)<br>/\ Up (0.2 line)<br>\/ Down (0.2 line)<br>: Reset |
| Column | End (changes column width, absolute):<br><< Left (0.1 character)<br>>> Right (0.1 character)<br>: Reset (to automatic width)<br>Convert (to % width)<br>Before (apply same width)<br>After (apply same width)<br>End (changes column width, relative):<br><< Left (0.1%)<br>>> Right (0.1%)<br>: Reset (to automatic width)<br>Convert (to character width)<br>Before (apply same width)<br>After (apply same width) |
| Row | End (changes Row height, absolute):<br>/\ Up (0.1 line)<br>\/ Down (0.1 line)<br>: Reset (to automatic height)<br>Convert (to % height)<br>Before (apply same height)<br>After (apply same height)<br>End (changes Row height, relative):<br>/\ Up (0.1%)<br>\/ Down (0.1%)<br>: Reset (to automatic height)<br>Convert (to character height)<br>Before (apply same height)<br>After (apply same height) |
| Cell | End (changes number of rows/columns spanned by cell):<br><< Left (reduce cell span by one column)<br>>> Right (extend cell span by one column)<br>/\ Up (reduce cell span by one row)<br>\/ Down (extend cell span by one row)<br>: Reset (to 1 column and 1 row) |
| Number | End (changes width):<br><< Left (1 character narrower)<br>>> Right (1 character wider)<br>/\ Reset (to standard width) |
| Time | End (changes duration):<br><< Left (qtr. hour less)<br>>> Right (qtr. hour more)<br>/\ Up (1 minute more)<br>\/ Down (1 minute less) |

Center Zone 103J: Drag

| Object | Commands |
|---|---|
| Document | Drag (document):<br><< Left (unit panel)<br>>> Right (unit panel)<br>/\ Up (unit panel)<br>\/ Down (unit panel)<br>: Enter (activate child object) |
| While entering characters:<br>Text<br>File<br>Date<br>Image<br>Music<br>Video<br>Message | Select characters or insertion point |
| Text (while browsing) | Drag:<br><< Before<br>>> After<br>: Enter (start text entry) |
| While browsing:<br>File<br>Date<br>Image<br>Music<br>Video<br>Message | Drag:<br><< Before<br>>> After<br>: Enter (load object) |
| While playing:<br>Image<br>Music<br>Video<br>Message | Drag (Play mode):<br>: Exit |
| Absolute positioned objects (excl. Document, Item in List, Column, Row, Cell) | Drag (Overlay object):<br><< Left (pixels)<br>>> Right (pixels)<br>/\ Up (pixels)<br>\/ Down (pixels)<br>: Enter (activate child object) |
| Paragraph<br>Item in List<br>Cell | Drag:<br><< Before<br>>> After<br>: Enter (activate child object)<br>Drag (empty object):<br>: Enter (create Text object) |

-continued

Center Zone 103J: Drag

| Object | Commands |
| --- | --- |
| Table | Drag: |
| Row | << Before |
| Column | >> After |
| List | : Enter (activate child object) |
| Number | Drag: |
| Time | << Before |
| Shape (In-flow) | >> After |

Outside Zone 103K: Go To

If the user clicks on a control region 101 outside the currently active control region 101, the object corresponding to the selected control region 101 is made active.

In one embodiment, whenever the user clicks at a location not within a control region 101 of an existing object, a new copy of a "resource" document is loaded into the empty space. The resource document is the highest-level object in the object hierarchy.

If the user drags the cursor 110 across a series of objects, these objects are highlighted. When the button is released or the pen is lifted, the most recently highlighted object is activated and a new control region 101 appears surrounding this object. If the user moves the cursor 110 beyond the limits of the active object, the contents of the object are automatically scrolled to make additional objects accessible for activation.

Additional navigation among objects is available by activating a menu corresponding to outside zone 103K, or by performing a stroke or other action as listed below, while the cursor 110 is located in outside zone 103K.
Go to:
First (sibling)
Last (sibling)
<< Previous
>> Next
/\ Parent
V Child
: This (Document)
Resource 1
Resource 2
. . .
Resource n Resources 1 through n are defined in the "Resource" document and specify all major groupings of user information, hardware devices, and network resources, as described in more detail below. Typical resource definitions include:
Preferences
House
Media
Address
Name
EMail
Date
Subject
Phone
Web
Offline Storage
Printers The following tables summarize alternate command menus for the various zones 103 according to one embodiment. For each type of object listed, a number of available commands are shown; these commands may be available via an alternate menu (activated, for example, by right-clicking) and/or via alternate stroke commands, alternate double-clicks or other actions, as indicated on the table with symbols such as << (left stroke), >> (right stroke), ^ (up stroke), v (down stroke), and : (double-click).

Upper Left Zone 103A (Alternate): Fill Color

Fill color can be applied to any objects except for those that have no interior space (such as lines, arcs, and points). Activating the fill color menu causes a palette to appear, from which the user can select the desired color.

Upper Middle Zone 103B (Alternate): Zoom

| Object | Commands |
| --- | --- |
| Document | Zoom: |
| Text | << Smaller |
| File | >> Larger |
| Date | /\ Previous (font) |
| Music | V Next (font) |
| Message | : Reset (standard size and font) |
| Number | Serif |
| Time | Cursive |
| Paragraph | Monospace |
| List | |
| Item in List | |
| Table | |
| Row | |
| Column | |
| Cell | |
| Image | Zoom: |
| Video | << Smaller |
| | >> Larger |
| | /\ Thumbnail |
| | : Reset (revert to original size) |
| Shape: | Zoom: |
| Rectangle | << Smaller |
| Oval | >> Larger |
| Line | |
| Arc | |
| Point | |
| Shape: | Zoom: |
| Scribble | << Smaller |
| | >> Larger |
| | : Reset (revert to original size) |

Upper Right Zone 103C (Alternate): Undo

Alternate-clicking within zone 103C activates an undo command. The user can also activate the alternate menu to navigate within the history of commands, as follows:
Undo (2 History objects):
<< Older (show History)
>> Newer (show History)
V Show all
/\ All
: This (most recent History)

Middle Left Zone 103D (Alternate): Text Color

Text color can be applied to any object that includes text. Activating the text color menu causes a palette to appear, from which the user can select the desired color.

Middle Right Zone 103E (Alternate): Transform To

| Object | Commands |
| --- | --- |
| Document | Transform to: |
| | Protected |
| | Unprotected |
| | Cleaned up |
| | Original version |
| | Save |

Middle Right Zone 103E (Alternate): Transform To

| Object | Commands |
|---|---|
| Text | Transform to: |
|  | << Combine |
|  | >> Split |
|  | File |
|  | Date |
| File | Transform to: |
|  | >> Split |
|  | ∨ Displayed content |
|  | Text |
| Date | Transform to: |
|  | >> Split |
|  | ∨ Displayed content |
|  | Text |
| Image | Transform to: |
| Music | >> Split |
| Video | ∨ Displayed content |
| Message |  |
| Shape-Line | Transform to: |
|  | Rectangle |
|  | Oval |
| Shape-Arc | Transform to: |
|  | Line |
|  | Rectangle |
|  | Oval |
| Shape-Scribble | Transform to: |
|  | Line |
|  | Rectangle |
|  | Oval |
| Shape-Rectangle | Transform to: |
|  | Line |
|  | Oval |
| Shape-Oval | Transform to: |
|  | Line |
|  | Rectangle |
| Shape-Point | Transform to: |
|  | Oval |
| Paragraph | Transform to: |
| List | << Combine |
| Item in List | >> Split |
| Table | ∨ Displayed content |
|  | List |
| Column | Transform to: |
| Row | << Combine |
|  | >> Split |
| Cell | Transform to: |
|  | << Combine |
|  | >> Split |
|  | List |
| Number | Transform to: |
| Time | >> Split |
|  | Text |

Lower Left Zone 103F (Alternate): Border Color

Border color can be applied to any object potentially having a border. This includes, for example, images, numbers, times, paragraphs, lists, items in lists, tables, and cells. Activating the border color menu causes a palette to appear, from which the user can select the desired color.

Lower Middle Zone 103G (Alternate): Align

| Object | Commands |
|---|---|
| Document | Not available |
| Music |  |
| Video |  |
| Message |  |
| Image |  |
| Text | Align (text vertically): |
| File | ∧ Up (superscript) |
| Date | ∨ Down (subscript) |
|  | : Reset (normal) |
|  | Overlay (NOT in-flow positioning) |
|  | Before (same as this) |
|  | After (same as this) |
| Shape | Align (to grid): |
|  | << Left |
|  | >> Right |
|  | ∧ Up (larger grid size) |
|  | ∨ Down (smaller grid size) |
|  | : Reset (normal) |
|  | In-flow (Not overlay positioning) |
|  | Before (same as this) |
|  | After (same as this) |
| Overlay objects (excludes: Document, Column, Row, Cell) | Align (to grid): |
|  | << Left |
|  | >> Right |
|  | ∧ Up (larger grid size) |
|  | ∨ Down (smaller grid size) |
|  | : Reset (normal) |
|  | In-flow (Not overlay positioning) |
|  | Before (same as this) |
|  | After (same as this) |
| Paragraph | Align (contained objects horizontally): |
| List | << Left |
| Item in List | >> Right |
| Table | ∧ Justify text (and left align) |
|  | ∨ Center |
|  | : Reset (normal) |
|  | Overlay (NOT in-flow positioning) |
|  | Before (same as this) |
|  | After (same as this) |
| Row | Align (cell content horizontal & vertical): |
| Column | << Left |
| Cell | >> Right |
|  | ∧ Top |
|  | ∨ Bottom |
|  | : Reset (normal) |
|  | Center (horizontal & vertical) |
|  | Horizontal center |
|  | Vertical center |
|  | Before (same as this) |
|  | After (same as this) |
| Number | Align (decimal point position): |
|  | << Left |
|  | >> Right |
|  | : Reset (normal) |
|  | Overlay (NOT in-flow positioning) |
|  | Before (same as this) |
|  | After (same as this) |
| Time | Align (object): |
|  | Overlay (NOT in-flow positioning) |
|  | Before (same as this) |
|  | After (same as this) |

Lower Right Zone 103H (Alternate): Border

| Object | Commands |
|---|---|
| Document | Not available |
| Text |  |
| File |  |
| Date |  |
| Music |  |
| Video |  |
| Message |  |
| Image | Border (surrounding object): |
| Number | << Thinner |

-continued

Lower Right Zone 103H (Alternate): Border

| Object | Commands |
| --- | --- |
| Time | >> Thicker |
| Paragraph | /\ Previous (border type) |
| List | \/ Next (border type) |
| Item in List | : Reset (standard border) |
| Table | None |
| Cell | Ridge |
| | Solid |
| | Double |
| | Groove |
| | Inset (current) |
| | Outset |
| | Dashed |
| | Dotted |
| Row | Border (between rows): |
| | \/ Add |
| | : Reset (between columns & rows) |
| | Border (between rows): |
| | /\ Remove |
| | : Reset (between columns & rows) |
| Column | Border (between columns): |
| | \/ Add |
| | : Reset (between columns & rows) |
| | Border (between columns): |
| | /\ Remove |
| | : Reset (between columns & rows) |
| Shape | Border (line type & width = 4): |
| | << Thinner |
| | >> Thicker |
| | /\ Previous (border type) |
| | \/ Next (border type) |
| | : Reset (single, solid, width = 2) |
| | Single (current) |
| | Double |
| | Triple |
| | Solid (current) |
| | Dotted |
| | Dashed |
| | Dot Dash |

Center Zone 103J (Alternate): Copy

When the user alternate-clicks within zone 103J, a copy of the active object is copied by moving the outline of the active object to another destination. The destination object can be in another document.

The user can activate a menu for positioning and manipulating the copy of the currently active object. The menu includes the following commands (some or all of which are also available via strokes):

Copy (move outline to destination):
/\ Up (pixels)
\/Down (pixels)
<< Left (pixels)
>> Right (pixels)
:Exit (activate this document)

Outside Zone 103K (Alternate): Scroll

Scroll commands are accessed by alternate-clicking outside control region 101. As long as the button is held or the pen stays in contact with the display, the currently active object is directly scrolled using the pen or mouse movement. In one embodiment, as the scrolling limits of the object are reached, the object's outer edge (corresponding to the direction of scrolling) changes color.

In another embodiment, an alternate-click activates a scroll menu containing the following commands:
Scroll (document):
<< Left (half page)
>> Right (half page)
/\ Up (half page)
\/ Down (half page)
: Reset (top or bottom)

As with the other menus described above, commands can also be directly activated by performing the stroke, double-click, or other action indicated.

Wherever possible, each zone provides unified, consistent access to a group of commands that are related to a particular theme. The input actions of clicking, click-and-hold, or stroking provide various ways to access commands within the group.

For example, zone 103A operates as follows in connection with objects of a time-varying nature (such as audio, video, animations, and the like). Zone 103A provides commands for changing the start of the data object (for example, if the data object is a video stream, zone 103A allows manipulation of the time code at which the video stream begins). As described in the table above, stroking in zone 103A changes the start point by an amount and direction that depend on the direction of the stroke. For example, vertical strokes would cause coarse adjustments to the start point to be made (changing the minutes), while horizontal strokes would cause fine adjustments to be made (changing the seconds). Alternatively, vertical strokes might change the value by a one-hour increment (or some other relatively coarse increment), while horizontal strokes might change the value by a one-minute increment (or some other relatively fine increment). In general, strokes in the up and left directions move the start point earlier, while strokes in the down and right directions move the start point later. The particular increments and directions of movement can be preset, or can be user-configurable via a preferences or options screen.

Example

Input Field

Figure 7:
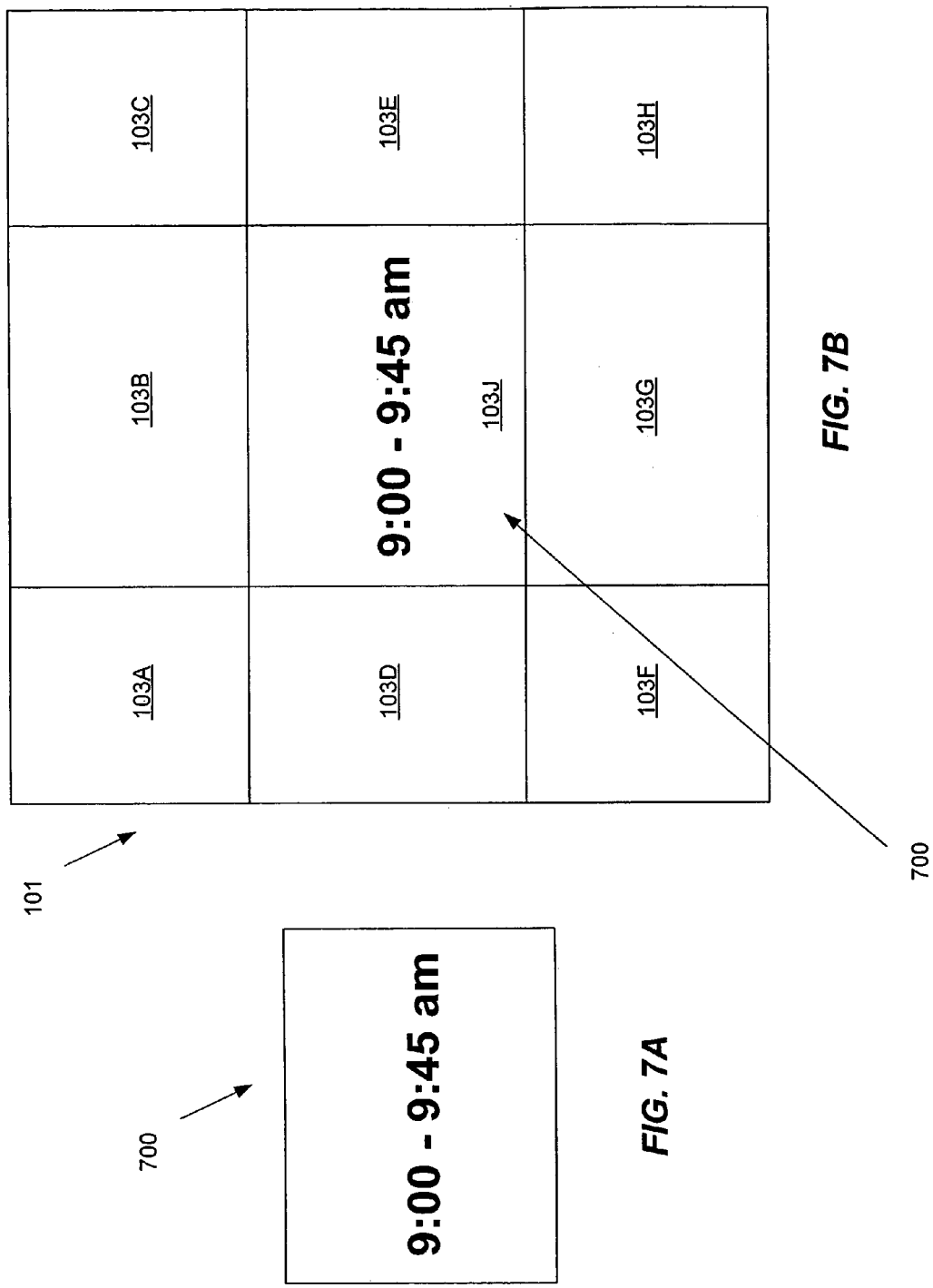
FIGS. 7A and 7B depict an example of the operation of the present invention in connection with an input field.

Referring now to FIGS. 7A and 7B, there is shown an example of the operation of the present invention in connection with a particular type of object: an input field 700. FIG. 7A depicts input field 700 before control region 101 has been made active (for example, before input field 700 has focus or has been selected). The example input field 700 of FIG. 7A indicates a time period (9:00–9:45), as may be included for example in a calendaring program for maintaining information about appointments and reminders. Input field 700 is an object that has two primary purposes: 1) to display a representation of a time period; and 2) to accept user input for changing the time period and/or the manner in which it is displayed.

In one embodiment, input field 700 is made active (or has "focus") when a user clicks or taps within its bounds or otherwise selects the field. As shown in FIG. 7B, control region 101, including zones 103, then becomes visible. The example of FIG. 7B illustrates how zones 103, described in general terms above, provide specific functionality for facilitating user input to change the value and format for the time period represented by input field 700. Specifically:

Zone 103A allows the user to change the start of the time period. As described above, vertical strokes indicate coarse changes, while horizontal strokes indicate fine changes. In one embodiment, the time period adjustment is repeated if the user holds the stylus or other pointing device in position at the end of the stroke; in another embodiment, the time period adjustment is repeated if the user continues to stroke in the same direction (if desired, a wait period can be implemented before the repetition commences, as is conventionally done in auto-repeat modes for keyboards). The time period adjustment repetition can be set to accelerate if the user continues to hold for a predetermined period of time. In one embodiment, the user can "back up" if the time period adjustment goes to far. The display of input field 700 is continually adjusted so that the user can see the time period adjustments in real-time and release or backtrack at precisely the correct moment.

Zone 103H allows the user to change the end point of the time period. End point adjustment is performed using the same coarse/fine adjustment paradigm described above in connection with zone 103A.

Zones 103B, 103C, 103D, 103E, 103F, 103G, and 103J provide commands as described above.

In one embodiment, the duration of the event remains constant when the start point is changed (so that the end point changes by the same amount as the start point). In another embodiment, the end point is held constant when the start point is changes (so that the duration changes). In yet another embodiment, the user can shift-click or indicate by a modifier key which of these two modes of operation is desired; alternatively, the mode can be set via a preferences or options screen.

Example

Tables and Cells

The present invention provides a consistent interface for manipulating the characteristics of table objects and cell objects. Sizes, such as row heights, column widths, and overall table sizes, can be specified in absolute terms or as a percentage of a containing object. For example, a cell width can be configured to be 25% of the width of the containing table; if the table width is increased, the cell width increases proportionately. The user interface allows for selection and operation on individual cells, rows, columns, or the entire table. In one embodiment, for example, clicking on a corner of the table selects the entire table; clicking on the left or right edge selects the table row at the clicked location; clicking on the top or bottom edge selects the table column at the clicked location; and clicking on a cell selects the individual cell. In one embodiment, the control region is presented for the selected cell, column, row, or table, so that the user can then activate commands within the various zones of the active control region.

Keyboard Input

In addition to the input modes described above, the user can also activate commands via a standard keyboard such as a QWERTY keyboard. In one embodiment, each zone 103 is associated with a keystroke; striking the corresponding key causes the menu 801 for that zone 103 to be displayed. Stroke commands, double-click commands, and the like can also be associated with keystrokes, so that the user can activate the command by striking the corresponding key (accompanied, perhaps, by a Control key, an Alt key, or some other modifier key). Letters, or other indicators, can be displayed within zones 103 to show which keystroke corresponds to each zone 103. Keystrokes for zones 103 can be configured in a mnemonically suitable manner (for example, Ctrl-G corresponds to Go To, while Ctrl-C corresponds to copy).

Figure 4A:
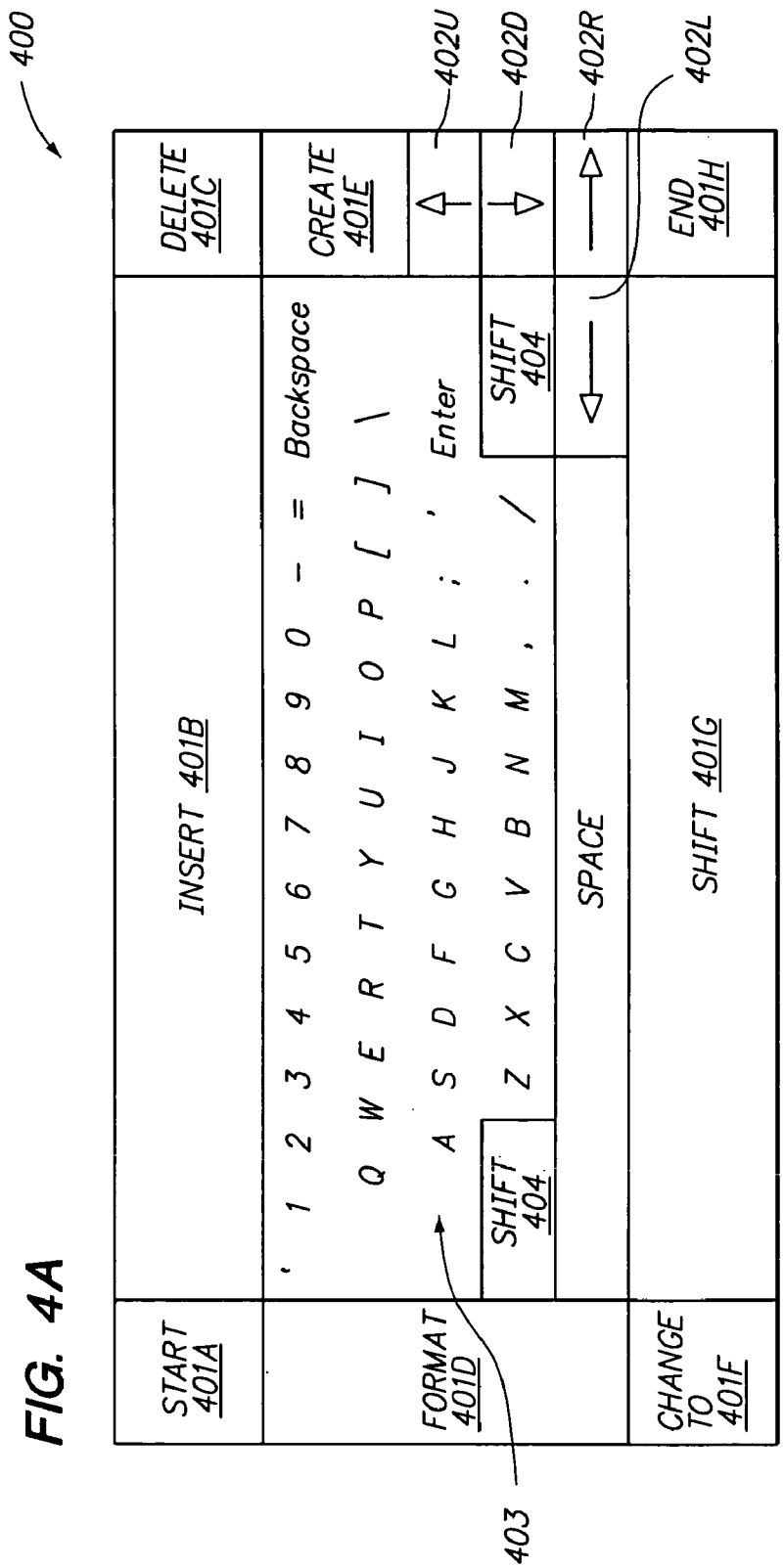
FIGS. 4A and 4B depict examples of a keyboard that includes additional keys corresponding to various zones.
Figure 4B:
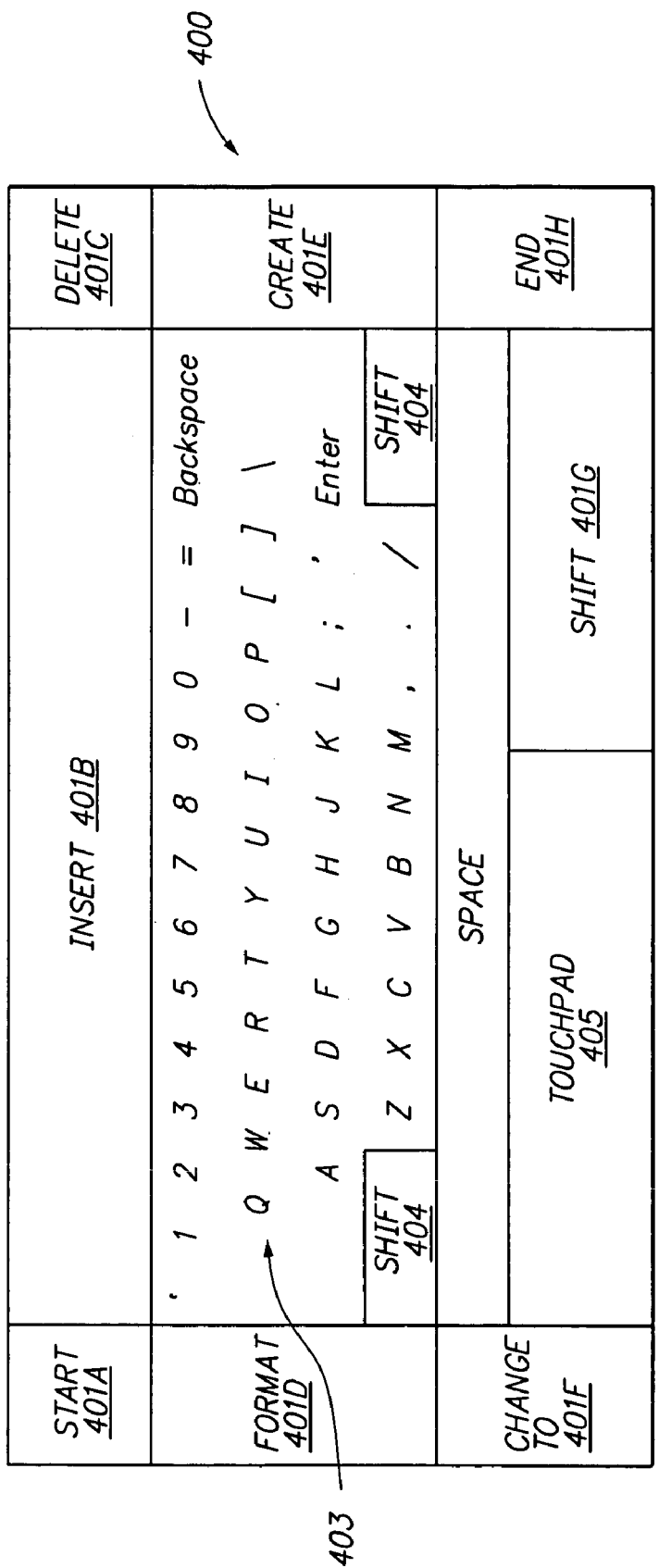

Referring now to FIGS. 4A and 4B, there is shown an example of a keyboard 400 that includes additional keys 401 corresponding to various zones 103. Keys 401 are positioned around the perimeter of a standard QWERTY keyboard 403, with each key 401 in a location that maps to the corresponding zone 103. For example, key 401A, which activates the start menu 801, is located at the top left corner of keyboard 400, a location that corresponds to the location of zone 103A that also activates the start menu 801. Similar correspondences apply for keys 401B through 401H. Alternate menus can be activated, for example, by holding down shift key 404 while pressing the desired zone key 401.

In the example of FIG. 4A, keyboard 400 also includes keys 402U, 402D, 402L, 402R that, when pressed, perform stroke actions corresponding to up, down, left, and right strokes. A user can press a key 401 followed by a stroke key 402 to perform an action in the zone 103 corresponding to the pressed key 401. In one embodiment, when the user presses key 401, the system waits a short, predetermined period of time (such as ¼ second) before presenting the menu associated with key 401. If, during that waiting period, the user presses one of keys 402U, 402D, 402L, 402R, or if he or she presses key 401 again, the command associated with the specified stroke or double-click is immediately performed and the menu is not displayed. If, during the waiting period, the user presses an alphabetic key indicating a desired command from the menu, the command is executed immediately, again without the menu itself being displayed. If the user performs neither of these actions during the waiting period, the system proceeds with display of the menu. In this manner, the system accommodates expert users (who are familiar with the command structure and do not need to see the menus before activating commands within them), and novices (who wish to see the available commands before activating one).

Alternatively, an alternate stroke action can be activated by pressing shift plus a key 401 followed by a stroke key 402. Stroke keys 402 can be configured to auto-repeat when held down for a predetermined length of time. In one embodiment, pressing the Enter key is equivalent to double-clicking on the zone 103 corresponding to the most recently pressed key 401.

In the example of FIG. 4B, keyboard 400 includes touchpad 405 for performing stroke actions; these replace stroke keys 402 of FIG. 4A. Moving a finger across touchpad 405 is equivalent to a pen stroke or mouse movement, a tap is equivalent to a click, and a double-tap is equivalent to a double-click. A user can press a key 401 and stroke or tap touchpad 405 to perform a stroke action in the zone 103 corresponding to the pressed key 401. Alternatively, stroke action can be activated by pressing shift plus a key 401 and then stroking or tapping touchpad 405. For example, to capitalize first letters of each word in the active object, a user presses Change To button 401F and then performs a right stroke on touchpad 405.

One skilled in the art will recognize that keys 401 and 402 may be implemented as standard keys or buttons, or touch-sensitive regions surrounding QWERTY keyboard 403, or by some other technique. Alternatively, a standard keyboard can be used, wherein some keys are reassigned, either temporarily or permanently, to perform commands analogous to zones 103. In one embodiment, keys are reassigned according to their physical locations on the keyboard. For example, a standard "Esc" key accesses the Start command corresponding to zone 401A; a Tab key accesses the Format command corresponding to zone 401D; standard arrow keys can activate strokes, and the like. Alternate menus can be activated, for example, by holding down shift key 404 while pressing the desired zone key 401.

In another embodiment, a standard keyboard can be used, and menus 801 and commands can be chosen via keystrokes that correspond to the first letter (or some other letter) of the menu 801 or command. Arrow keys can be used to navigate within a menu 801 once it has been displayed. An enter key can be used to activate the currently highlighted menu item.

Using the above techniques, the present invention can be implemented in a manner that allows all input to be provided on a keyboard without requiring pen, mouse, or other pointing device.

Voice Input

In one embodiment, the user interface of the present invention can be combined with existing voice-activated user interface systems. The user can activate a command by speaking a word corresponding to the desired command. Voice recognition software, as is well known in the art, interprets signals from the microphone to determine what words were spoken by the user. The command corresponding to the spoken word is then performed.

In one embodiment, the user activates a voice command by first speaking one of the words corresponding to a zone 103 of a control region. The command menu 801 for that zone 103 is displayed, and the user can activate a command within the menu 801 by speaking the word corresponding to the desired command. Alternatively, if the user wishes to bypass the menu display, he or she can simply speak the word for a zone 103 followed immediately by the name of the command within the menu 801 for that zone 103. For example, a user can say "Format"; the format menu 801 is then displayed; and the user can say "Bold" to choose the Bold command from the format menu 801. Alternatively, the user can simply say "Format Bold" to activate the Bold command.

In one embodiment, the system of the present invention also accepts voice input for dictation and transcription. Thus, the user can enter text by speaking into the microphone; the system interprets the spoken words as text input. Such functionality is implemented according to well known voice input techniques.

Remote Control Input

Figure 5:
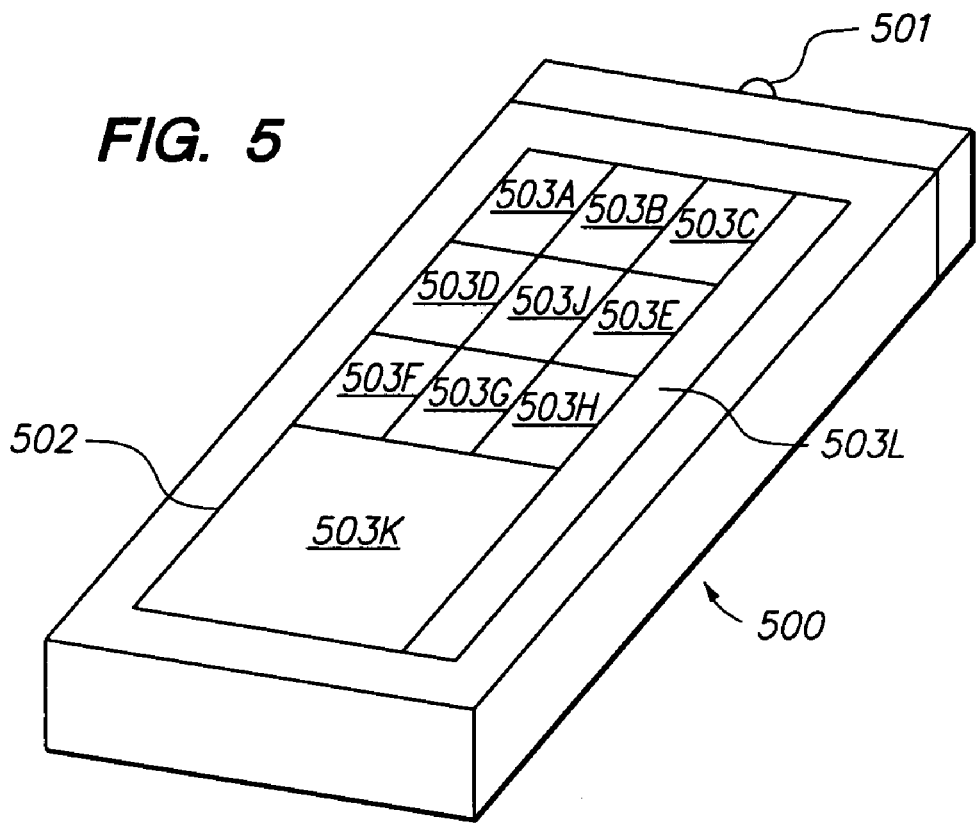
FIG. 5 depicts an example of a remote controller for providing input according to one embodiment of the invention.

In one embodiment, the system of the present invention accepts input provided via a remote controller. Referring now to FIG. 5, there is shown an example of a remote controller 500 according to one embodiment of the invention. Remote controller 500 transmits signals, such as infrared or RF signals, to a device (not shown) supporting the present invention via transmitter 501 according to well-known techniques.

In one embodiment, remote controller 500 includes touchpad 502 that is subdivided into a number of zones 503A through 503K. Zones 503A through 503H are arranged in a similar manner to zones 103A through 103K of the on-screen interface depicted in FIGS. 3A and 3B. Touching or stroking any of zones 503A through 503K effects the same result as touching or stroking corresponding zone 103A through 103K as described above. Touching a zone 503A through 503K and holding the finger for a moment prior to moving activates the zone's alternate (or secondary) command, as described above. In addition, touchpad 502 includes zone 503L which controls volume (for example, by stroking up or down to increase or decrease volume, or tapping to mute and unmute). The remote controller 500 generates an appropriate signal based on the touched/stroked zone 503, and transmits the signal to the device. The device has a signal receiver (e.g., IR receiver or RF receiver), which receives the signals, converts it to the appropriate format and semantics if needed by the operating system of the device, which provides the signal to an application having the user interface 100.

In another embodiment, remote controller 500 includes a number of buttons (not shown) that replace touchpad 502 and perform analogous functionality to zones 503 described above. Alternatively, one skilled in the art will recognize that other input knobs, buttons, wheels, and the like, may be provided instead of or in addition to those described herein. In addition, one skilled in the art will recognize that the particular arrangement of zones 503 in FIG. 5 is merely exemplary.

Screen Shot Examples

Figure 6:
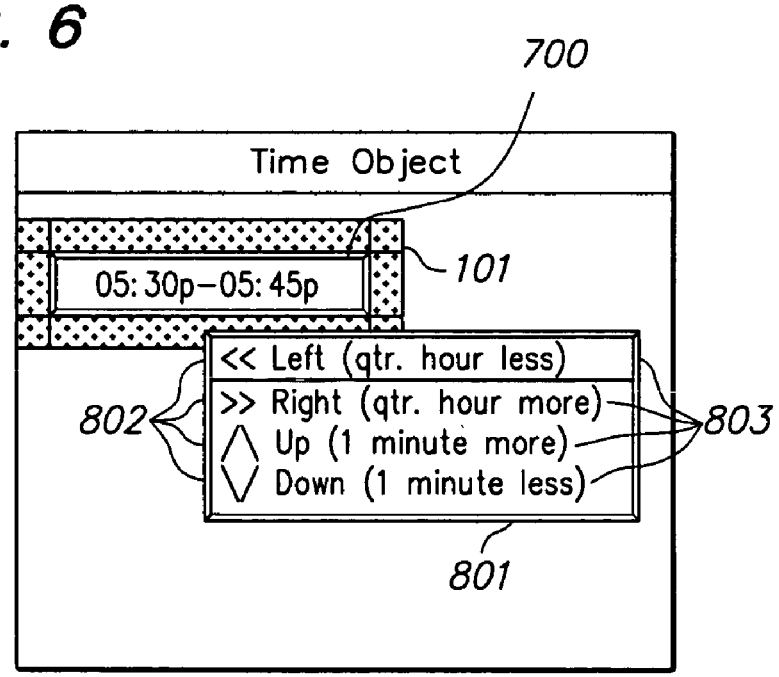
FIG. 6 is a screen shot depicting an example of a menu for an input field.

Referring now to FIG. 6, there is shown a screen shot depicting an example of a menu 801 for an input field 700. Menu 801 is activated by clicking on the lower right zone of control region 101. Input field 700 contains the value "05:30p–05:45p." Menu 801 includes commands 803 for changing the end time by various increments. Icons 802 indicate stroke directions corresponding to commands 803. In the example, horizontal strokes are used for coarse adjustments (by quarter-hour increments), and vertical strokes are used for fine adjustments (by one-minute increments).

Figure 8:
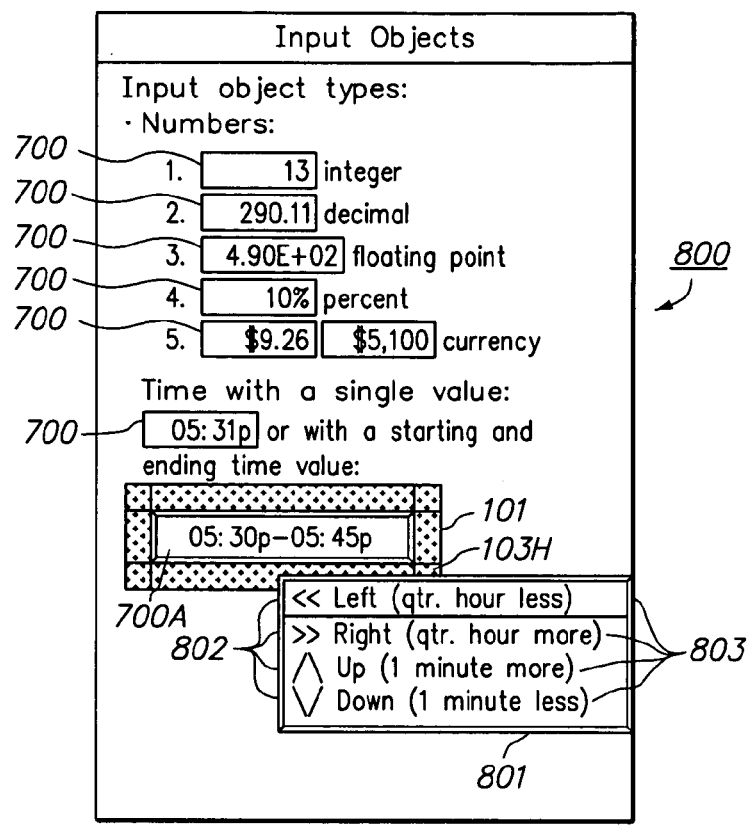
FIG. 8 is a screen shot depicting examples of input objects.

Referring now to FIG. 8, there is shown a screen shot depicting a window 800 including examples of input fields 700, 700A. Various types of numeric data are shown in input fields 700, 700A. The techniques of the present invention can be used to adjust or manipulate the values and formats for all of the examples shown, among others. One input field 700A currently has focus, and the user has activated menu 801 for input field 700A by clicking on the lower right zone 103H of control region 101. As in the example of FIG. 6, input field 700A contains the value "05:30p–05:45p." Menu 801 includes commands 803 for changing the end time by various increments. Icons 802 indicate stroke directions corresponding to commands 803. Again, horizontal strokes are used for coarse adjustments (by quarter-hour increments), and vertical strokes are used for fine adjustments (by one-minute increments).

Figure 9:
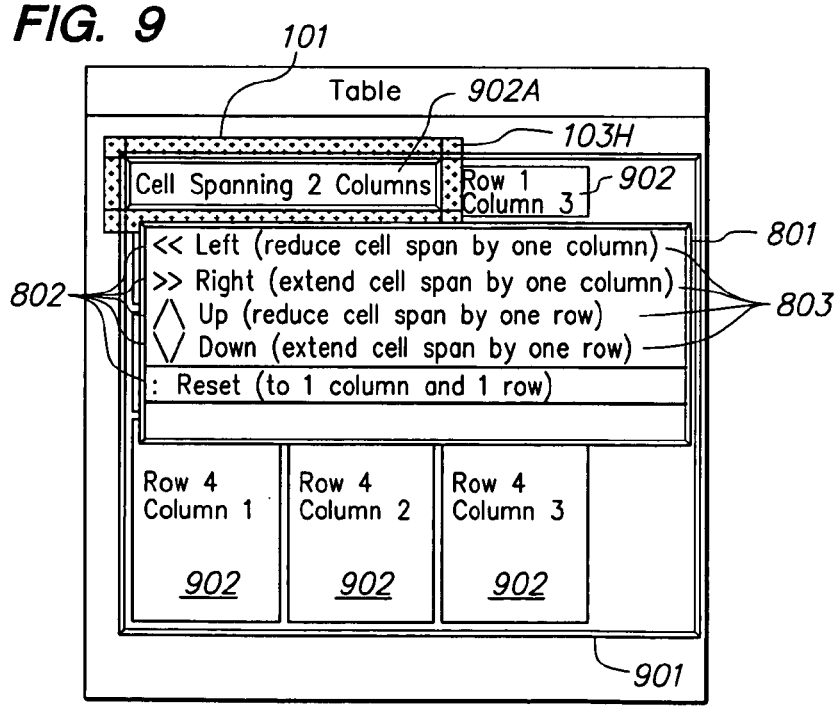
FIG. 9 is a screen shot depicting an example of a menu for a table cell.

Referring now to FIG. 9, there is shown a screen shot depicting an example of a menu 801 for a table cell 902A. Table 901 includes a number of cells 902, 902A. Cell 902A (which spans two columns of table 901) currently has focus, and the user has activated menu 801 by clicking on the lower right zone 103H of control region 101. Menu 801 includes commands 803 for reducing or extending cell 902A span in the horizontal and vertical directions, as well as a command 803 for resetting cell 902A span to one column and one row. Icons 802 indicate stroke directions corresponding to commands 803. One icon 802 is a symbol, indicating that the corresponding action for direct activation of the command is a double-click.

Figure 10:
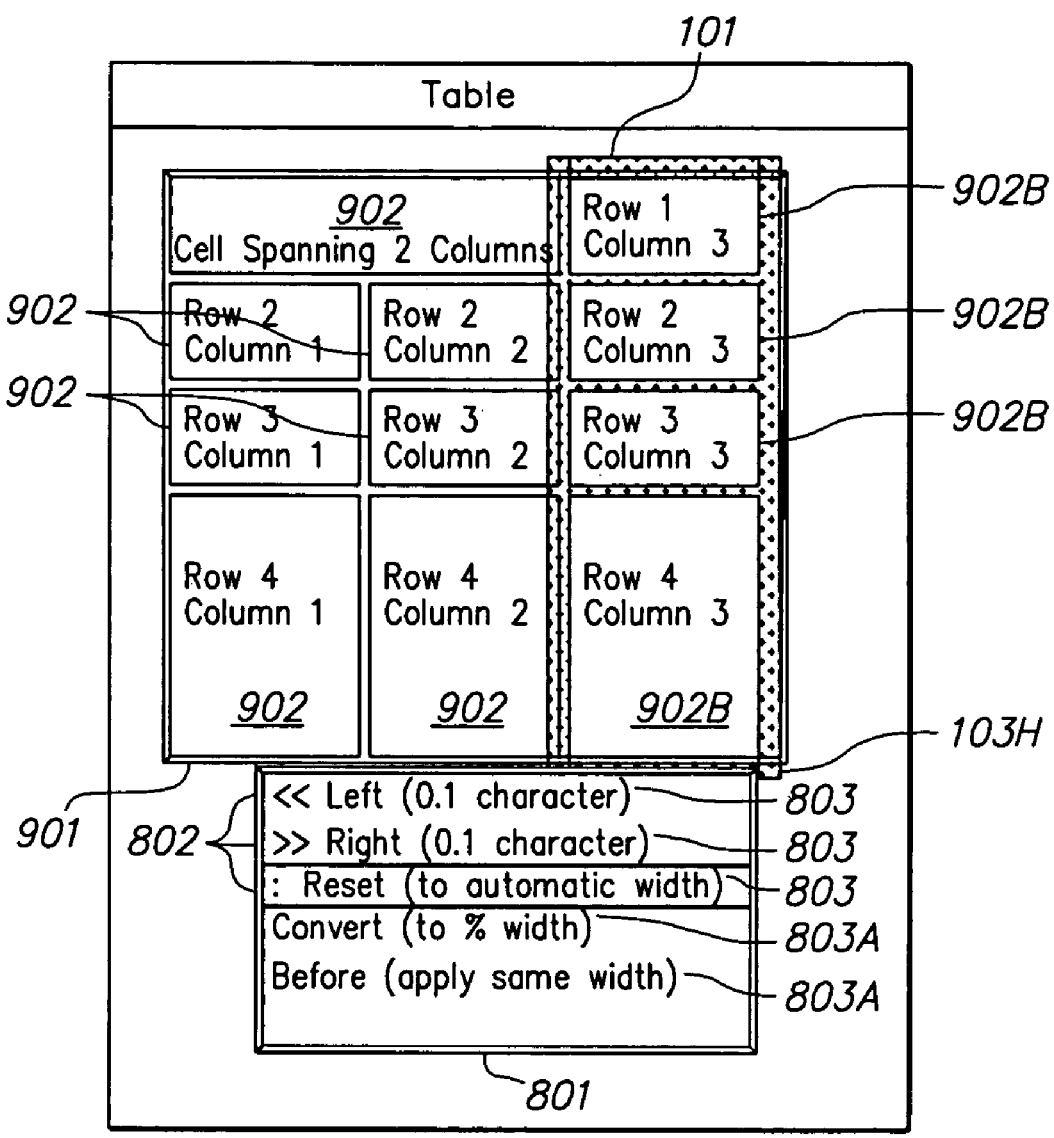
FIG. 10 is a screen shot depicting an example of a menu for a table column.

Referring now to FIG. 10, there is shown a screen shot depicting an example of a menu 801 for a table column. Table 901 includes a number of cells 902, 902B. Cells 902B collectively form a column that currently has focus. The user has activated menu 801 by clicking on the lower right zone 103H of control region 101. Menu 801 includes commands 803 for changing the width of the column and for resetting the width to an automatic width. Icons 802 indicate stroke directions corresponding to commands 803. One icon 802 is a ":" symbol, indicating that the corresponding action for direct activation of the command is a double-click. Menu 801 also includes additional commands 803A that are not directly activatable via a stroke or action.

Figure 11:
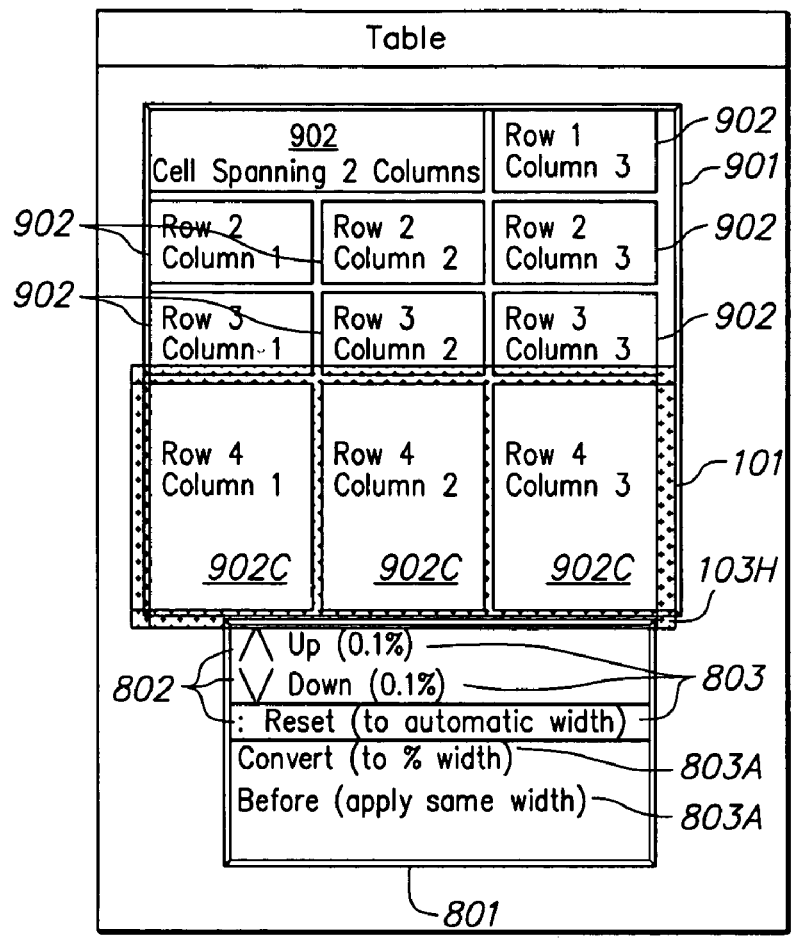
FIG. 11 is a screen shot depicting an example of a menu for a table row.

Referring now to FIG. 11, there is shown a screen shot depicting an example of a menu 801 for a table row. Table 901 includes a number of cells 902, 902C. Cells 902C collectively form a row that currently has focus. The user has activated menu 801 by clicking on the lower right zone 103H of control region 101. Menu 801 includes commands 803 for changing the height of the row and for resetting the height to an automatic height. Icons 802 indicate stroke directions corresponding to commands 803. One icon 802 is a ":" symbol, indicating that the corresponding action for direct activation of the command is a double-click. Menu 801 also includes additional commands 803A that are not directly activatable via a stroke or action.

Figure 12A:
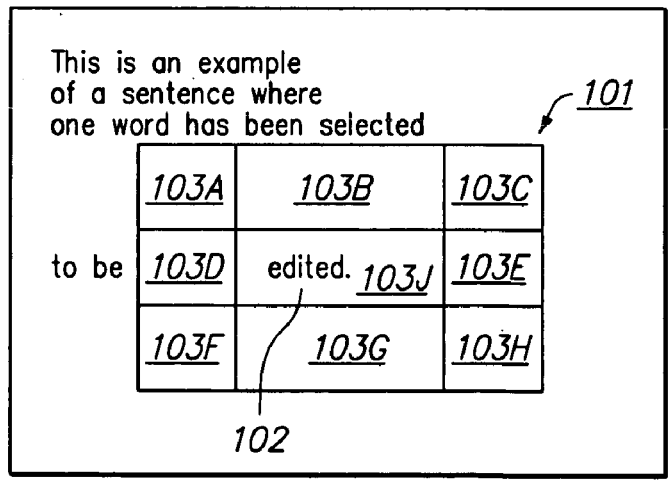
FIG. 12A depicts an example of a control region for a text object.

Referring now to FIG. 12A, there is shown an example of a control region 101 for a text object 102. Text object 102 is a word within a sentence. Control region 101 includes zones 103A through 103J as described above.

Figure 12B:
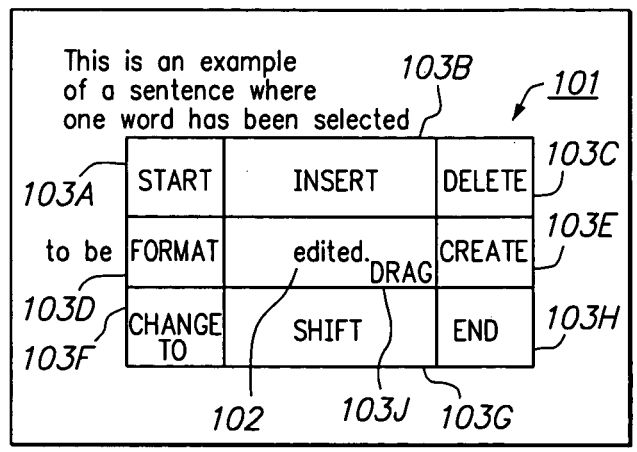
FIG. 12B depicts an example of a control region for a text object, the control region including text labels.

Referring now to FIG. 12B, there is shown another example of a control region 101 for text object 102. Again, text object 102 is a word within a sentence, and control region 101 includes zones 103A through 103J as described above. In the example of FIG. 12B, each zone 103 includes a text label to indicate the type of commands available from that zone 103.

Figure 12C:
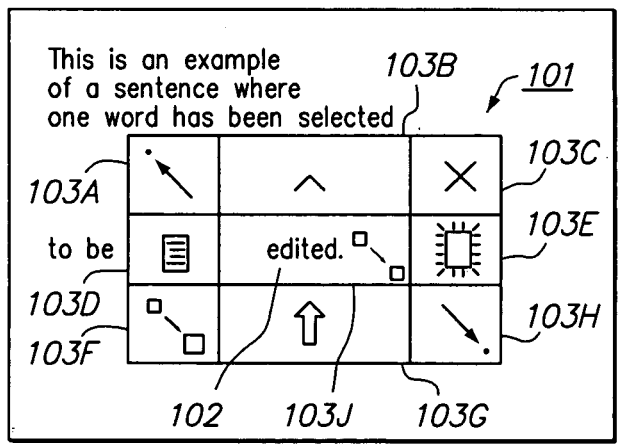
FIG. 12C depicts an example of a control region for a text object, the control region including icon labels.

Referring now to FIG. 12C, there is shown another example of a control region 101 for text object 102. Again, text object 102 is a word within a sentence, and control region 101 includes zones 103A through 103J as described above. In the example of FIG. 12C, each zone 103 includes an icon label to indicate the type of commands available from that zone 103.

Figure 12D:
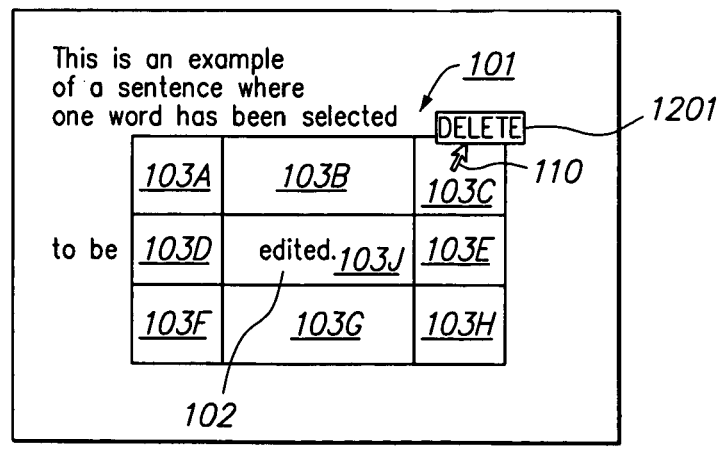
FIG. 12D depicts an example of a control region for a text object, the control region including a pop-up label.

Referring now to FIG. 12D, there is shown another example of a control region 101 for text object 102. Again, text object 102 is a word within a sentence, and control region 101 includes zones 103A through 103J as described above. In the example of FIG. 12D, a pop-up label 1201 (also known as a ToolTip) appears when cursor 110 hovers over a particular zone 103. The pop-up label 1201 can include text or an icon to indicate the type of commands available from the corresponding zone 103. Pop-up label 1201 can be configured to appear only after cursor 110 has hovered over zone 103 for a predetermined length of time, and can further be configured to disappear when cursor 110 leaves zone 103 and/or after a predetermined period of time. The technique exemplified by FIG. 12D provides a convenient reminder of the functionality for each zone 103 without unduly cluttering the display and without consuming valuable screen real estate. Zones 103 and control region 101 can be made smaller, as there is no need to provide adequate room for text or icon labels within each zone 103.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD–ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A user interface for a device including a display, for manipulating an object displayed on the display, the device executing program instructions for providing the user interface, the user interface comprising:
   a displayed representation of the object; and
   a control region surrounding the displayed representation of the object and comprising a plurality of zones for accepting object manipulation commands via an input device and via at least two modes of user input;
   wherein, for at least one of the zones, at least two commands are activatable within the zone, depending on the mode of user input received.

2. The user interface of claim 1, further comprising an input device for accepting user input in the zones.

3. The user interface of claim 2, wherein the input device comprises at least one selected from the group consisting of:
   a tablet for detecting a stylus position;
   a mouse;
   a touchpad;
   a pointing device;
   a touch-sensitive screen;
   a keyboard;
   a microphone for accepting voice input; and
   a remote controller.

4. The user interface of claim 1, wherein the input device comprises a keyboard including keys for activating commands associated with the zones.

5. The user interface of claim 1, wherein the input device comprises a keyboard, and wherein standard keys on the keyboard are selectively assigned to activate commands associated with the zones.

6. The user interface of claim 1, wherein the input device comprises a keyboard including additional keys for activating commands associated with the zones.

7. The user interface of claim 1, wherein the zones are arranged in a grid.

8. The user interface of claim 1, wherein the zones are arranged in a matrix comprising rows of cells, and wherein the object representation is located within a cell of the matrix.

9. The user interface of claim 1, wherein the zones are arranged in a matrix comprising three rows of three cells each, and wherein the object representation is located in the center cell of the center row.

10. The user interface of claim 1, wherein the user input modes comprise at least two selected from the group consisting of:
    an activation command;
    an activation command concurrent with a modifier key;
    voice input;
    keyboard input;
    remote controller input;
    mouse input;
    stroke input; and
    menu command selection.

11. The user interface of claim 1, further comprising:
    a menu activatable by performing a menu activation command for a zone, the menu comprising commands, wherein the menu is displayed in proximity to the zone upon activation.

12. The user interface of claim 11, wherein at least one of the menu commands is also directly activatable by at least one of stroking, pressing a button, or double-clicking within the zone.

13. The user interface of claim 11, wherein performing the menu activation command comprises positioning an on-screen cursor within the zone and pressing a button.

14. The user interface of claim 11, wherein performing the menu activation command comprises issuing a voice command.

15. The user interface of claim 11, wherein the menu includes, for at least one command, an icon indicating a stroke direction for directly activating the command.

16. The user interface of claim 11, wherein a stroke command for a zone is activatable by positioning an on-screen cursor within the zone and stroking the cursor.

17. A computer-implemented method for manipulating an object, comprising:
    displaying a representation of the object;
    displaying a control region surrounding the object and comprising a plurality of zones for accepting object manipulation commands on the object via at least two modes of user input, wherein, for at least one of the zones, at least two commands are activatable within the zone, depending on the mode of user input received;
    receiving user input in one of the zones; and
    responsive to the user input and to the mode of the user input, changing a characteristic of the object.

18. The method of claim 17, wherein each mode of user input comprises one selected from the group consisting of:
    stylus position input;
    mouse input;
    touchpad input;
    pointing device input;
    touch-sensitive screen input;
    keyboard input;
    voice input; and
    remote controller input.

19. The method of claim 17, wherein one mode of user input comprises receiving keyboard input from a keyboard including keys for activating commands associated with the zones.

20. The method of claim 17, wherein one mode of user input comprises receiving keyboard input from a keyboard having standard keys on the keyboard selectively assigned to activate commands associated with the zones.

21. The method of claim 17, wherein one mode of user input comprises receiving keyboard input from a keyboard including additional keys for activating commands associated with the zones.

22. The method of claim 17, wherein the zones are arranged in a grid.

23. The method of claim 17, wherein the zones are arranged in a matrix comprising rows of cells, and wherein the object representation is located within a cell of the matrix.

24. The method of claim 17, wherein the zones are arranged in a matrix comprising three rows of three cells each, and wherein the object representation is located in the center cell of the center row.

25. The method of claim 17, further comprising:
    responsive to a menu activation command, displaying a menu for a zone, the menu comprising commands, wherein the menu is displayed in proximity to the zone upon activation.

26. The method of claim 25, wherein at least one of the menu commands is also directly activatable by at least one of stroking, pressing a button, or double-clicking within the zone.

27. The method of claim 25, wherein the menu activation command comprises positioning an on-screen cursor within the zone and pressing a button.

28. The method of claim 25, wherein the menu activation command comprises a voice command.

29. The method of claim 25, wherein the menu includes, for at least one command, an icon indicating a stroke direction for directly activating the command.

30. The method of claim 25, wherein the menu indicates a double-click command for direct activation of each directly activatable command.

31. The method of claim 25, wherein a stroke command for a zone is activatable by positioning an on-screen cursor within the zone and stroking the cursor.

32. The method of claim 25, wherein a double-click command for a zone is activatable by positioning an on-screen cursor within the zone and double-clicking.

33. A computer program product for manipulating an object, comprising:
 a computer-readable medium; and
 computer program code, encoded on the medium, for:
  displaying a representation of the object;
  displaying a control region surrounding the object and comprising a plurality of zones for accepting object manipulation commands on the object via at least two modes of user input, wherein, for at least one of the zones, at least two commands are activatable within the zone, depending on the mode of user input received;
  receiving user input in one of the zones; and
  responsive to the user input and to the mode of the user input, changing a characteristic of the object.

34. The computer program product of claim 33, wherein each mode of user input comprises one selected from the group consisting of:
 stylus position input;
 mouse input;
 touchpad input;
 pointing device input;
 touch-sensitive screen input;
 keyboard input;
 voice input; and
 remote controller input.

35. The computer program product of claim 33, wherein one mode of user input comprises receiving keyboard input from a keyboard including keys for activating commands associated with the zones.

36. The computer program product of claim 33, further comprising computer program code for:
 responsive to a menu activation command, displaying a menu for a zone, the menu comprising commands, wherein the menu is displayed in proximity to the zone upon activation.

37. The computer program product of claim 36, wherein at least one of the menu commands is also directly activatable by at least one of stroking, pressing a button, or double-clicking within the zone.

38. The computer program product of claim 36, wherein the menu includes, for at least one command, an icon indicating a stroke direction for directly activating the command.

39. A system for manipulating an object displayed on a display, comprising:
 a display, for displaying a representation of the object and for displaying a control region surrounding the displayed representation of the object and comprising a plurality of zones for accepting object manipulation commads via an input device and via at least two modes of user in-put, wherein, for at least one of the zones, at least two commands are activatable within the zone, depending on the mode of user input received;
 an input device for accepting user input in the zones; and
 a processor, coupled to the display and to the input device, for executing an object manipulation command in response to the user input and to the mode of the user input.

40. The system of claim 39, wherein the input device comprises at least one selected from the group consisting of:
 a tablet for detecting a stylus position;
 a mouse;
 a touchpad;
 a pointing device;
 a touch-sensitive screen;
 a keyboard;
 a microphone for accepting voice input; and
 a remote controller.

41. The system of claim 39, wherein the input device comprises a keyboard including keys for activating commands associated with the zones.

42. The system of claim 39, wherein the input device comprises a keyboard, and wherein standard keys on the keyboard are selectively assigned to activate commands associated with the zones.

43. The system of claim 39, wherein the input device comprises a keyboard including additional keys for activating commands associated with the zones.

44. The system of claim 39, wherein the zones are arranged in a grid.

45. The system of claim 39, wherein the zones are arranged in a matrix comprising rows of cells, and wherein the object representation is located within a cell of the matrix.

46. The system of claim 39, wherein the zones are arranged in a matrix comprising three rows of three cells each, and wherein the object representation is located in the center cell of the center row.

47. The system of claim 39, wherein the user input modes comprise at least two selected from the group consisting of:
 an activation command;
 an activation command concurrent with a modifier key;
 voice input;
 keyboard input;
 remote controller input;
 mouse input;
 stroke input; and
 menu command selection.

48. The system of claim 39, wherein, responsive to the input device receiving a menu activation command for a zone, the display further displays, in proximity to the zone upon activation, a menu comprising commands.

49. The system of claim 48, wherein at least one of the menu commands is also directly activatable by at least one of stroking, pressing a button, or double-clicking within the zone.

50. The system of claim 48, wherein the menu includes, for at least one command, an icon indicating a stroke direction for directly activating the command.

51. The system of claim 48, wherein a stroke command for a zone is activatable by positioning an on-screen cursor within the zone and stroking the cursor.

* * * * *